US00RE48405E

(19) United States
(12) Reissued Patent
Schaefer et al.

(10) Patent Number: US RE48,405 E
(45) Date of Reissued Patent: Jan. 26, 2021

(54) TYPE INFERENCE FOR DATALOG WITH COMPLEX TYPE HIERARCHIES

(71) Applicant: MICROSOFT TECHNOLOGY LICENSING, LLC, Redmond, WA (US)

(72) Inventors: Max Schaefer, Oxford (GB); Oege de Moor, Oxford (GB)

(73) Assignee: MICROSOFT TECHNOLOGY LICENSING, LLC, Redmond, WA (US)

(21) Appl. No.: 15/494,416

(22) Filed: Apr. 21, 2017

Related U.S. Patent Documents

Reissue of:

(64) Patent No.: 8,595,213
Issued: Nov. 26, 2013
Appl. No.: 13/183,514
Filed: Jul. 15, 2011

U.S. Applications:

(63) Continuation of application No. 14/952,788, filed on Nov. 25, 2015, now Pat. No. Re. 46,380, which is an application for the reissue of Pat. No. 8,595,213.

(Continued)

(51) Int. Cl.

| | |
|---|---|
| ***G06F 7/00*** | (2006.01) |
| ***G06F 16/242*** | (2019.01) |
| ***G06F 8/41*** | (2018.01) |

(52) U.S. Cl.
CPC ..... *G06F 16/2448* (2019.01); *G06F 8/437* (2013.01)

(58) Field of Classification Search
CPC . G06F 17/30421; G06F 8/437; G06F 16/2448
(Continued)

(56) References Cited

U.S. PATENT DOCUMENTS 6,006,214 A * 12/1999 Carey et al.
6,338,055 B1 * 1/2002 Hagmann et al.
(Continued)

OTHER PUBLICATIONS

Serge Abiteboul, Georg Lausen, Heinz Uphoff, and Emmanuel Waller, "Methods and rules". In ACM SIGMOD International Conference on Management of Data, pp. 32-41. ACM Press, 1993.
(Continued)

*Primary Examiner* — Joshua D Campbell
(74) *Attorney, Agent, or Firm* — Workman Nydegger

(57) ABSTRACT

What is disclosed are a novel system and method for inferring types of database queries. In one embodiment a program and associated database schema that includes a type hierarchy is accessed. The program includes query operations to a database that contains relations described by a database schema. Types are inferred from definitions in the program by replacing each database relationship in the program by the types in the database schema. A new program is generated with the types that have been inferred with the new program only accessing unary relations in the database. In another embodiment, testing of each of the types that have been inferred is performed for type emptiness. In response to type emptiness being found for a type that have been inferred, a variety of different operations are performing including removing the type, providing a notification regarding the emptiness found for the type, and more.

33 Claims, 12 Drawing Sheets

Related U.S. Application Data

(60) Provisional application No. 61/364,571, filed on Jul. 15, 2010.

(58) Field of Classification Search
USPC ..... 707/713, 803
See application file for complete search history.

(56) References Cited

U.S. PATENT DOCUMENTS

| | | | | |
|---|---|---|---|---|
| 7,089,266 | B2 * | 8/2006 | Stolte et al. | 707/769 |
| 7,512,642 | B2 * | 3/2009 | Hernandez-Sherrington | G06F 17/30587 |
| 2002/0069193 | A1 * | 6/2002 | Beavin et al. | 707/2 |
| 2005/0086639 | A1 * | 4/2005 | Min et al. | 717/114 |
| 2009/0234801 | A1 * | 9/2009 | Moor | G06F 8/437 |
| 2010/0017395 | A1 * | 1/2010 | Wayn | G06F 17/30592 707/E17.014 |

OTHER PUBLICATIONS

Leo Bachmair, Harald Ganzinger, and UweWaldmann, "Set constraints are the monadic class." In Logic in Computer Science, pp. 75-83, 1993.

Leo Bachmair, Harald Ganzinger, and UweWaldmann, "Superposition with Simplification as a Decision Procedure for the Monadic Class with Equality." in KGC '93: Proceedings of the Third Kurt Gödel Colloquium on Computational Logic and Proof Theory, pp. 83-96, London, UK, 1993, Springer-Verlag.

Sacha Berger, Emmanual Coquery, Wlodzimierz Drabent, and Artur Wilk, "Descriptive Typing Rules for Xcerpt and their soundness." in François Fages and Sylvain Soliman, editors, Principles and Practice of Semantic Web Reasoning, vol. 3703 of LNCS, pp. 85-100. Springer, 2005.

Ashok K. Chandra and Philip M. Merlin, "Optimal Implementation of Conjuctive Queries in Relational Data Bases." In STOC '77: Proceedings of the ninth annual ACM symposium on theory of computing, pp. 77-90, New York, NY, USA, 1977. ACM.

Surajit Chaudhuri, "Finding nonrecursive envelopes for Datalog predicates." In Principles of Database Systems (PODS), pp. 135-146, 1993.

Surajit Chaudhuri and Phokion G. Kolaitis, "Can Datalog be approximated?" In Principles of Database Systems (PODS), pp. 86-96, 1994.

Kevin J. Compton, "Stratified least fixpoint logic." Theoretical Computer Science, 31 (1):95-120, 1994.

Stavros Cosmadakis, Haim Gaifman, Paris Kanellakis, and Moshe Vardi, "Decidable Optimization Problems for Database Logic Programs." In Proceedings of the 20th annual ACM Symposium on Computing, pp. 477-490, 1988.

Olivier Coudert, Christian Berthet, and Jean Christophe Madre, "Verification of synchronous sequential machines based on symbolic execution." In Automatic Verification Methods for Finite State Systems, vol. 407 of Lecture Notes in Computer Science, pp. 365-373. Springer, 1989.

Oege de Moor, Damien Sereni, Pavel Avgustinov, and Mathieu Verbaere, "type Inference for Datalog and Its Application to Query Optimisation." In PODS '08: Proceedings of the twenty-seventh ACM SIGMOD-SIGACT-SIGART symposium on Principles of database systems, pp. 291-300, New York, NY, USA, 2008. ACM.

Oege de Moor, Damien Sereni, Mathieu Verbaere, Elnar Hajiyev, Pavel Avgustinov, Torjörn Ekman, Neil Ongkingco, and Julian Tibble, "QL: Object-oriented queries made easy." In Ralf Lämmel, João Saraiva, and Joost Visser, editors, Generative and Transformational Techniques in Software Engineering. LNCS. Springer, 2007.

Oege de Moor, Mathieu Verbaere, Elnar Hajiyev, Pavel Avgustinov, Torbjörn Ekman, Neil Ongkingco, Damiel Sereni, and Julian Tibble, "QL for source code analysis." In Source Code Analysis and Manipulation (SCAM '07), pp. 3-16. IEEE, 2007.

Thom W. Frühwirth, Ehud Y. Shapiro, Moshe Y. Vardi, and Eyal Yardeni, "Logic programs as types for logic programs." In Logic in Computer Science (LICS), pp. 300-309. IEEE Computer Society, 1991.

John P. Gallagher, Kim S. Henriksen, and Gourinath Banda, "Techniques for Scaling Up Analyses Based on Pre-Interpretations." In M. Gabbrielli and G. Gupta, editors, International Conference on Logic Programming (ICLP '05), vol. 3668 of LNCS, pp. 280-296. Springer, 2005.

John P. Gallagher and Germán Puebla, "Abstract Interpretation over Non-deterministic Finite Tree Automata for Set-Based Analysis of Logic Programs." In Practical Aspects of Declarative Languages (PADL), vol. 2257 of LNCS, pp. 243-261. Springer, 2002.

Nevin C. Heintze and Joxan Jaffar, "A finite presentation theorem for approximating logic programs." In Symposium on Principles of Programming Languages (POPL), pp. 197-209, 1990.

Kim Marriott, Harald Søndergaard, and Neil D. Jones, "Denotational Abstract Interpretation of Logic Programs." ACM Transactions on Programming Languages and Systems, 16(3):607-648, 1994.

Willard V. Quine, "On Cores and Prime Implicants of Truth Functions." The American Mathematical Monthly, 66(9):755-760, Nov. 1959.

Oded Shmueli, "Equivalence of Datalog Queries is Undecidable." Journal of Logic Programming, 15(3):231-241, 1993.

Fang Wei and Georg Lausen, "Containment of Conjunctive Queries with Safe Negation." In ICDT '03: Proceedings of the 9th International Conference on Database Theory, pp. 346-360, London, UK, 2002. Springer-Verlag.

John Whaley. JavaBDD. http://javabdd.sourceforge.net/, 2007.

Bwolen Yang, Randal E. Bryant, David R. O'Halloran, Armin Biere, Olivier Coudert, Geert Janssen, Rajeev K. Ranjan, and Fabio Somenzi, "A Performance Study of BDD-Based Model Checking." In 2nd International Conference on Formal Methods in Computer-Aided Design, vol. 1522 of Lecture Notes in Computer Science, pp. 255-289. Springer, 1998.

David Zook, Emir Pasalic, and Beata Sarna-Starosta, "Typed Datalog." In Practical Aspects of Declarative Languages, pp. 168-182. Springer Berlin/Heidelberg, 2009.

Max Schafer, Oege de Moor, "Type Inference for Datalog with Complex Type Hierarchies," POPL '10, Jan. 17-23, 2010, Madrid, Spain, copyright 2010 ACM 978-1-60558-479-9/10/01.

* cited by examiner $$
\begin{aligned}
bonus(x,y) \quad \leftarrow \quad & \exists z, f.(\ salary(x,z) \wedge factor(x,f) \wedge \\
& \qquad y = f \times z \wedge \neg student(x)\ ) \\
& \vee (y = 50 \wedge employee(x) \wedge student(x)) \\
\\
factor(x,y) \quad \leftarrow \quad & (junior(x) \wedge y = 0.1) \vee \\
& (senior(x) \wedge y = 0.15) \\
\\
query(x,y) \quad \leftarrow \quad & bonus(x,y) \wedge senior(x) \wedge manager(x)
\end{aligned}
$$

FIG. 1

$$
\begin{aligned}
& employee(x) \leftrightarrow junior(x) \vee senior(x) \\
& \neg(junior(x) \wedge senior(x)) \\
& parttime(x) \rightarrow employee(x) \\
& student(x) \wedge employee(x) \rightarrow parttime(x) \\
& manager(x) \rightarrow employee(x) \\
& manager(x) \rightarrow \neg parttime(x)
\end{aligned}
$$

FIG. 2

$$
\begin{aligned}
\lceil \bot \rceil &= \bot \\
\lceil t_1 \doteq t_2 \rceil &= t_1 \doteq t_2 \\
\lceil e(t_1, \ldots, t_n) \rceil &= u_1(t_1) \wedge \ldots \wedge u_n(t_n) \\
& \quad \text{for } e \in \mathbb{E} \text{ with } \mathscr{S}(e) = (u_1, \ldots, u_n) \\
\lceil r(t_1, \ldots, t_n) \rceil &= r(t_1, \ldots, t_n) \\
& \quad \text{for } r \in \mathbb{I} \\
\lceil \neg\varphi \rceil &= \top \\
\lceil \varphi \wedge \psi \rceil &= \lceil \varphi \rceil \wedge \lceil \psi \rceil \\
\lceil \varphi \vee \psi \rceil &= \lceil \varphi \rceil \vee \lceil \psi \rceil \\
\lceil \exists x.\varphi \rceil &= \exists x.\lceil \varphi \rceil \\
\lceil [r(\vec{x}) \equiv \varphi]\psi \rceil &= [r(\vec{x}) \equiv \lceil \varphi \rceil]\lceil \psi \rceil
\end{aligned}
$$

FIG. 3

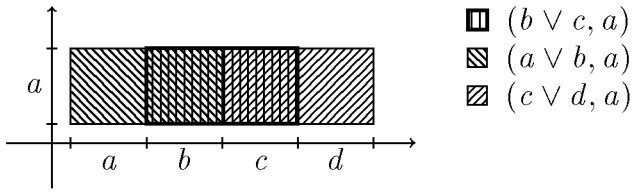

FIG. 4

Algorithm 1 $\textsc{Saturate}(T)$

Require: A typing $T$ of arity $n$.

Ensure: A saturated typing semantically equivalent to $T$

```
repeat
    T_old ← T
    for τ, τ' ∈ T_old do
        T ← max_⊥(T ∪ All-Consensus(n, τ, τ'))
until T_old = T
return T
```

FIG. 11

Algorithm 2 $\textsc{All-Consensus}(n, \tau, \tau')$

Require: Two TTCs $\tau$ and $\tau'$ of arity $n$.

Ensure: The lean set of all their consensus TTCs.

1: $S \leftarrow \emptyset$

2: for $J \subseteq \{1, \ldots, n\}$ do

3: $\quad S \leftarrow \max_{\perp}(S \cup \{\tau \oplus_J \tau'\})$

4: $S \leftarrow \max_{\perp}(S \cup \{\tau \oplus_{\exists} \tau'\})$

5: return $S$

FIG. 12

Algorithm 3 $\textsc{All-Consensus-Opt}(n, \tau, \tau')$

Require: Two TTCs $\tau$ and $\tau'$ of arity $n$.

Ensure: The lean set of all their consensus TTCs.

```
1: v ← τ ⊼̄ τ'
2: N^⊥ ← ∅
3: l, r ← ⊤
4: for i = 1 to n do
5:     if v_i = ⊥ then
6:         N^⊥ ← N^⊥ ∪ {i}
7:         l, r ← l ∧ τ_i, r ∧ τ'_i
8: S ← All-Consensus-Rec(n, v, τ, l, τ', r, N^⊥, 1)
9: if N^⊥ = ∅ then
10:     S ← max_⊥(S ∪ {τ ⊕_∃ τ'})
11: return S
```

FIG. 13

Algorithm 4 $\textsc{All-Consensus-Rec}(n, v, \tau, l, \tau', r, J, i)$

Require: Two TTCs $\tau$ and $\tau'$ of arity $n$, their meet $v$, a set $J \subseteq \{1, \ldots, n\}$, an index $1 \leq i \leq n$, and two partial results $l = \bigwedge\{j \in J \mid t_j\}$, $r = \bigwedge\{j \in J \mid t'_j\}$.

Ensure: The lean set of all consensus TTCs of $\tau$ and $\tau'$ over index sets $J' \supseteq J$ such that $J \cap \{1, \ldots, i-1\} = J' \cap \{1, \ldots, i-1\}$.

```
if l = ⊥ ∨ r = ⊥ then
    return ∅
if i = n then
    if l <: r ∨ r <: l then
        return ∅
    return {τ ⊕_J τ'}
S ← All-Consensus-Rec(n, v, τ, l, τ', r, J, i + 1)
if i ∈ J ∨ l <: τ_i ∧ r <: τ'_i then
    return S
l, r ← l ∧ τ_i, r ∧ τ'_i
J ← J ∪ Part(v, i)
i ← i + 1
S ← max_⊥(S ∪ All-Consensus-Rec(n, v, τ, l, τ', r, J, i))
return S
```

FIG. 14

TYPE INFERENCE FOR DATALOG WITH COMPLEX TYPE HIERARCHIES

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

CROSS-REFERENCE TO RELATED APPLICATIONS

[This application] *More than one reissue application has been filed for the reissue of U.S. Pat. No. 8,595,213. The other reissue application in addition to the present reissue application is U.S. patent application Ser. No. 14/952,788, filed on Nov. 25, 2015. The present application is a continuation reissue application of U.S. reissue application Ser. No. 14/952,788, filed on Nov. 25, 2015, and is also a reissue application of U.S. application Ser. No. 13/183,514, which was filed on Jul. 15, 2011, and issued as U.S. Pat. No. 8,595,213 on Nov. 26, 2013, which* is based upon and claims priority from prior provisional patent application No. 61/364,571, filed on Jul. 15, 2010 the entire disclosure of which is herein incorporated by reference.

FIELD OF THE INVENTION

The present invention relates generally to information retrieval, in particular the way electronically stored data is accessed via queries that are formulated in a programming language. The invention concerns both the detection of errors in such queries, and their efficient execution.

BACKGROUND OF THE INVENTION

Like any other programming task, writing queries is error-prone, and it is helpful if the programming language in which queries are expressed gives assistance in identifying errors while queries are being written, and before they are executed on a database. Programming languages often provide "types" for that purpose, indicating for each variable what kind of value it may hold. A programming language for expressing queries is usually called a "query language". The most popular example of a query language is SQL.

In SQL, and in most other query languages in prior art, types are assigned to each variable separately. As a consequence, very few errors are caught before the query is executed on a database. The only kind of error found is when an operation does not make sense: for instance, a string cannot be subtracted from an integer. In particular one cannot predict accurately (without running the query), whether a query will return any results or not. And yet, a query that returns no results is the most common symptom of a programming error.

In the logic programming community, some attempts have been made to construct type checkers that detect queries where there are no results at all, regardless of the contents of the database being queried. None of these attempts precisely tracks the dependencies between variables, however, and therefore they are suboptimal: there are many queries for which one could prove that no results are returned, and yet the type checkers do not find the errors. It is very confusing for users that some errors of this kind are caught, and others are not.

In the theoretical database community, there has been some work on proving containment between queries, but this is typically restricted to unnatural fragments of the query language. Furthermore these works do not take advantage of the type hierarchies that typically exist on data stored in a database.

What is desired, therefore, but not yet accomplished before the present invention, is a system and method of computing types for queries that accurately approximate the actual set of results, taking the type hierarchy into account.

BRIEF DESCRIPTION OF THE DRAWINGS

FIG. 1 is an example program written in Datalog with a sequence of rules.

FIG. 2 is an example of a type hierarchy suitable for the program in FIG. 1.

FIG. 3 is a definition listing illustrating the approximation of every use of an extensional relation symbol by the conjunction of its column types.

FIG. 4 is a diagram illustrating the need for consensus formation when checking type inclusion.

FIG. 11 is algorithm 1 of the present invention.

FIG. 12 is algorithm 2 of the present invention.

FIG. 13 is algorithm 3 of the present invention.

FIG. 14 is algorithm 4 of the present invention.

DESCRIPTION OF THE PREFERRED EMBODIMENTS

Figure 5:
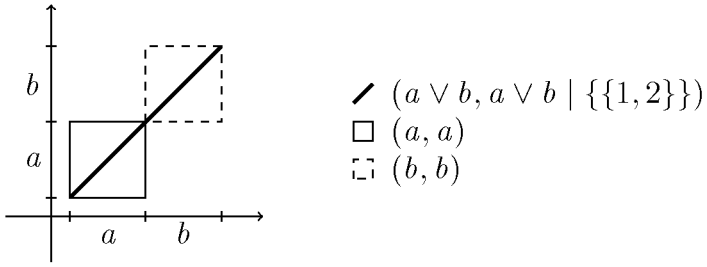
FIG. 5 is a diagram further illustrating the need for consensus formation when checking type inclusion.

It should be understood that these embodiments are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in the plural and vice versa with no loss of generality.

1. Introduction

The present invention infers precise types for queries where the entities in the database satisfy complex conditions regarding subtyping, disjointness and so on.

To illustrate, consider the Datalog program in FIG. 1, which is a slight adaptation of an example in [1]. It assumes a database that contains monadic extensional relations for employee, senior, junior, parttime, student and manager. These monadic relations capture the entities that are manipulated by queries, and they are the building blocks of types. There is furthermore an extensional relation salary(x, z).

In the program, additional intensional relations are defined: bonus(x, y) computes the bonus y that an employee x will get. Non-students x get a bonus y that is computed by multiplying x's salary z by a factor f, which is returned by factor(x, f). The factor depends on the seniority of the employee. For students, the bonus is always 50, independent of their salary. Finally, the program defines a query, which is to find the bonus of all senior managers.

The entity types are expected to satisfy many interesting facts that are useful in reasoning about types, for instance those shown in FIG. 2. We call such a set of facts the type hierarchy. Note that the type hierarchy goes well beyond the usual notion of subtyping in traditional programming languages, in that one can state other relationships besides mere implication or equivalence. An example of such an interesting fact is the last statement, which says that managers cannot be part-time employees. The programmer will have to state these facts as part of the database definition, so that they can be checked when information is entered, and to enable their use in type inference and optimisation.

To do type inference, we of course also need to know some facts about extensional relations. For instance, $$\text{salary}(x, z) \rightarrow \text{employee}(x) \wedge \text{float}(z)$$

states that the first column of the extensional relation salary will contain values of type employee, and the second one will contain floating point numbers. A database schema provides this column-wise typing information for every extensional relation.

Given the schema and the hierarchy, type inference should infer the following implications from the definitions in the program:

$$\text{bonus}(x, y) \rightarrow \text{employee}(x) \wedge \text{float}(y)$$

$$\text{factor}(x, y) \rightarrow \text{employee}(x) \wedge \text{float}(y)$$

$$\text{query}(x, y) \rightarrow \text{senior}(x) \wedge \text{manager}(x) \wedge \text{float}(y)$$

Note how these depend on facts stated in the type hierarchy: for example, in inferring the type of factor, we need to know that employee is the union of junior and senior.

Type inference will catch errors: when a term is inferred to have the type $\perp$, we know that it denotes the empty relation, independent of the contents of the database. Also, the programmer may wish to declare types for intensional relations in her program, and then it needs to be checked that the inferred type implies the declared type.

The benefits of having such type inference for queries is not confined to merely checking for errors. Precise types are also useful in query optimisation. In particular, the above query can be optimised to:

$$\text{query}(x, y) \leftarrow \text{manager}(x) \wedge \text{senior}(x) \wedge \text{salary}(x, z) \wedge y = 0.15 \times z$$

This rewriting relies on the fact that we are asking for a manager, and therefore the disjunct in the definition of bonus that talks about students does not apply: a student is a parttime employee, and managers cannot be parttime. Again notice how the complex type hierarchy is crucial in making that deduction. The elimination of disjuncts based on the types in the calling context is named type specialisation; type specialisation is very similar to virtual method resolution in optimising compilers for object-oriented languages. Similarly, the junior alternative in the definition of factor can be eliminated. Once type specialisation has been applied, we can eliminate a couple of superfluous type tests: for instance, $\neg$ student(x) is implied by manager(x). That is called type erasure. The key to both type specialisation and type erasure is an efficient and complete test for type containment, which takes all the complex facts about types into account.

Overview The general problem we address is as follows. Given the class of all Datalog programs $\mathcal{P}$, we identify a sublanguage $\mathcal{T}$ of type programs. Type inference assigns an upper bound $\lceil p \rceil$ in the language of type programs to each program p. To say that $\lceil p \rceil$ is an upper bound is just to say that p (plus the schema and the type hierarchy) implies $\lceil p \rceil$. The idea of such 'upper envelopes' is due to Chaudhuri [8, 9].

In Section 2 we propose a definition of the class of type programs: any program where all extensionals called are monadic. Type programs can, on the other hand, contain (possibly recursive) definitions of intensional predicates of arbitrary arity. We then define a type inference procedure $\lceil p \rceil$, and prove that its definition is sound in the sense that $\lceil p \rceil$ is truly an upper bound of p. Furthermore, it is shown that for negation-free programs p, the inferred type $\lceil p \rceil$ is also optimal: $\lceil p \rceil$ is the smallest type program that is an upper bound of p.

For negation-free programs, the definition of $\lceil p \rceil$ is in terms of the semantics of p, so that the syntactic presentation of a query does not affect the inferred type. It follows that the application of logical equivalences by the programmer or by the query optimiser does not affect the result of type inference.

The restriction that programs be negation-free can be relaxed to allow negation to occur in front of sub-programs that already have the shape of a type program. Not much more can be hoped for, since sound and optimal type inference for programs with arbitrary negations is not decidable.

To also do type checking and apply type optimisations, we need an effective way of representing and manipulating type programs. To this end, we identify a normal form for a large and natural class of type programs in Section 3. The class consists of those type programs where the only negations are on monadic extensionals (i.e., entity types). There is a simple syntactic containment check on this representation, inspired by our earlier work reported in [13].

That simple containment check is sound but not complete. A geometric analysis of the incompleteness in Section 4 suggests a generalisation of the celebrated procedure of Quine [22] for computing prime implicants. We present that generalised procedure, and show that the combination of the simple containment check plus the computation of prime implicants yields a complete algorithm for testing containment of type programs.

The algorithm we present is very different from the well-known approach of propositionalisation, which could also be used to decide containment. The merit of our novel algorithm is that it allows an implementation that is efficient in common cases. We discuss that implementation in Section 5. We furthermore present experiments with an industrial database system that confirm our claims of efficiency on many useful queries.

Finally, we discuss related work in Section 6, and conclude in Section 8.

In summary, the original contributions of this paper include:

- The identification of a language of type programs for Datalog, suitable both for precise error checking and for type-based optimisations.
- The definition of a very simple type inference procedure that is proved sound and optimal.
- A containment check for type programs that relies on a novel generalisation of Quine's method of computing prime implicants.

Experiments in an industrial database system that show that this containment algorithm is efficient and useful.

2. Type Programs

It is customary to write Datalog programs as a sequence of rules as seen in FIG. 1, but this syntax is too imprecise for our purposes. In the remainder of the paper, all Datalog programs will be written as formulae of Stratified Least Fixpoint Logic (SLFP) over signatures without function symbols.

This logic, presented for example in [10], extends first order logic (including equality) with fixpoint definitions of the form $[r(x_1, \ldots, x_n) \equiv \phi]\psi$. Here, r is an n-ary relation symbol, the $x_i$ are pairwise different element variables, and $\phi$ and $\psi$ are formulae. Intuitively, the formula defines r by the formula $\phi$, which may contain recursive occurrences of r, and the defined relation can then be used in $\psi$.

The $x_i$ are considered bound in $\phi$ and free in $\psi$, whereas the relation r is free in $\phi$ and bound in $\psi$. To ensure stratification, free relation symbols are not allowed to occur under a negation, which avoids the problematic case of recursion through negation. For example, the formula $$[s(x, y) \equiv x \doteq y \vee \exists z.e(x, z) \wedge s(z, y)]s(x, y) \tag{1}$$

defines the relation s to be the reflexive transitive closure of e. By way of illustration (and only in this example), free occurrences of element variables and relation variables have been marked up in bold face. The formula is trivially stratified since no negations occur anywhere.

In this program, the relation symbol s is an intensional predicate since it is given a defining equation. On the other hand, relation e is an extensional, which we assume to be defined as part of a database on which the program is run. We will denote the set of intensional relation symbols as $\mathcal{I}$ and that of extensional relation symbols as $\mathbb{E}$, and require them to be disjoint.

Model-theoretically, the role of the database is played by an interpretation $\mathcal{I}$ which assigns, to every n-ary relation symbol $e \in \mathbb{E}$, a set of n-tuples of some non-empty domain. To handle free variables we further need an assignment $\sigma$ that maps free element variables to domain elements and free relation variables to sets of tuples.

Just as in first order logic, we can then define a modelling judgement $\mathcal{I} \models_{\sigma} \phi$ stating that formula $\phi$ is satisfied under interpretation $\mathcal{I}$ and assignment $\sigma$. In particular, stratification ensures that formulae can be interpreted as continuous maps of their free relation variables, so that fixpoint definitions can be semantically interpreted by the least fixpoints of their defining equations.

For a formula $\phi$ with a single free element variable x, we set $[[\phi]]\mathcal{I} := \{c \mid \mathcal{I} \models_{x:=c} \phi\}$, omitting the subscript $\mathcal{I}$ where unambiguous.

Just as the semantics of the intensional predicates is determined with respect to the semantics of the extensional predicates, the types of the intensional predicates are derived with respect to the types of the extensional predicates. These are provided by a schema $\mathcal{S}$ which assigns, to every n-ary extensional predicate, an n-tuple of types. As is customary, types are themselves monadic predicates from a set $\mathbb{T} \subseteq \mathbb{E}$ of type symbols. For consistency, we require that the schema assigns a type symbol to itself as its type.

For the program in (1), for example, we might have two type symbols a and b, with the schema specifying that $\mathcal{S}(e) = (a, b)$ and of course $\mathcal{S}(a) = (a)$, $\mathcal{S}(b) = (b)$.

Semantically, we understand this to mean that in every interpretation of the extensional symbols conforming to the schema, the extension of a given column of an extensional symbol should be exactly the same as the extension of the type symbol assigned to it by the schema.

We can define a first order formula, likewise denoted as $\mathcal{S}$, which expresses this constraint: For every n-ary relation symbol $e \in \mathbb{E} \setminus \mathbb{T}$ and every $1 \leq i \leq n$ where $u \in \mathbb{E}$ is the type assigned to the i-th column of e, the formula $\mathcal{S}$ contains a conjunct $$\forall x_i.(\exists x_1, \ldots, x_{i-1}, x_{i+1}, \ldots, x_n.e(x_1, \ldots, x_n)) \leftrightarrow u(x_i) \tag{2}$$

Our example schema above, for instance, would be expressed by the formula $$(\forall x.(\exists y.e(x,y)) \leftrightarrow a(x)) \wedge (\forall y.(\exists x.e(x, y)) \leftrightarrow b(y))$$

In the literature, the types assigned by the schema are often not required to fit exactly, but merely to provide an over-approximation of the semantics. We could achieve this by relaxing (2) to use an implication instead of a bi-implication.

Instead, we take a more general approach by allowing arbitrary additional information about the types to be expressed through a hierarchy formula $\mathcal{H}$. Our only requirements about this formula are that it be a closed first order formula containing only type symbols (and no other relation symbols).

In particular, the hierarchy may stipulate subtyping relations; in our example, the hierarchy could be $\forall x.a(x) \rightarrow b(x)$, expressing that a is a subtype of b. Perhaps more interestingly, it can also express disjointness of types, e.g. by stating that $\forall x.\neg a(x) \vee \neg b(x)$; we could then deduce that in the definition of the reflexive transitive closure e can, in fact, be iterated at most once. Many other kinds of constraints are just as easily expressed, and provide opportunities for advanced optimisations.

We now approximate programs by type programs, which are programs that only make use of type symbols (and no other extensional relation symbols), and do not contain negation. (Compare this with the hierarchy which can contain negations, but no fixpoint definitions.) To every SLFP formula $\phi$ we assign a type program $\lceil\phi\rceil$ by replacing negated subformulae with $[\tau]T$ and approximating every use of an extensional relation symbol by the conjunction of its column types. The complete definition is given in FIG. 3.

For our example program, we would obtain the type $$[s(x, y) \equiv x \doteq y \vee \exists z.a(x) \wedge b(z) \wedge s(z, y)]s(x, y)$$

which is semantically equivalent to $$x \doteq y \vee a(x) \wedge b(y)$$

We will see in the next section that, in fact, fixpoint definitions can always be eliminated from such type programs, yielding formulae of monadic first order logic.

As the example suggests, the types assigned to programs semantically over-approximate them in the following sense:

Theorem 1 (Soundness). For every program $\phi$ we have $$\mathcal{S}, \mathcal{H}, \phi \models \lceil\phi\rceil$$

That is, every interpretation and assignment satisfying the schema, the hierarchy and $\phi$ also satisfies $\lceil\phi\rceil$.

Proof Sketch. We can show by induction on $\phi$ the following stronger version of the the—orem: For any interpretation $\mathcal{I}$ with $\mathcal{I} \models \mathcal{S}$ and any two assignments $\sigma$ and $\sigma'$, which assign the same values to element variables, and where $\sigma(r) \subseteq \sigma'(r)$ for every $r \in \mathbb{I}$, we have $\mathcal{I} \models_{\sigma'} \lceil\phi\rceil$ whenever $\mathcal{I} \vdash_{\sigma} \phi$.

From this, of course, it follows that $\mathcal{S}, \phi \models \lceil\phi\rceil$, and again $\mathcal{S}, \mathcal{H}, \phi \models \lceil\phi\rceil$ by monotonicity of entailment.

Perhaps more surprisingly, our type assignment also yields the tightest such over-approximation, in spite of our very lax restrictions on the hierarchy:

Theorem 2 (Optimality). For a negation-free program $\phi$ and a type program $\vartheta$, if we have $$\mathscr{S}, \mathscr{H}, \phi \models \vartheta$$

then also $$\mathscr{S}, \mathscr{H}, \lceil\phi\rceil \models \vartheta$$

To prove this theorem, we need a monotonicity result for the type assignment.

Lemma 3. For two negation-free programs $\phi$ and $\psi$, if it is the case that $\mathscr{S}, \mathscr{H}, \phi \models \psi$ then also $\mathscr{S}, \mathscr{H}, \lceil\phi\rceil \models \lceil\psi\rceil$.

An easy way to prove this result is to make use of cartesianisation, which is the semantic equivalent of the typing operator $\lceil\bullet\rceil$. For a relation $R \subseteq D^n$, we define its cartesianisation cart $(R)=\pi_1(R) \times \ldots \times \pi_n(R)$ to be the cartesian product of the columns of R. Likewise, the cartesianisation cart($\mathcal{I}$) of an interpretation $\mathcal{I}$ is the interpretation which assigns cart($\mathcal{I}$ (e)) to every relation symbol e.

It is then not hard to see that $$\text{cart}(\mathcal{I}) \models_{\sigma} \phi \Leftrightarrow \mathcal{I} \models_{\sigma} \lceil\phi\rceil \tag{3}$$

for any negation-free formula $\phi$, interpretation $\mathcal{I}$ and assignment $\sigma$ whenever $\mathscr{S} \vdash \mathscr{S}$. Also, cart($\mathcal{I}$) $\vdash \mathscr{S}$ if $\mathcal{I} \models \mathscr{S}$, and cart($\mathcal{I}$) $\models \mathscr{H}$ iff $\mathcal{I} \models \mathscr{H}$.

From this observation, we easily get the

Proof of Lemma 3. Assume $\mathscr{S}, \mathscr{H}, \phi \mid \psi$, and let $\mathcal{I}, \sigma$ be given with $\mathcal{I} \models \mathscr{S}, \mathscr{H} \models \mathcal{I}$ and $\mathcal{I} \models_{\sigma} \lceil\phi\rceil$.

By (3), we have cart($\mathcal{I}$) $\mid \mathscr{S}$, cart($\mathcal{I}$) $\mid \mathscr{H}$ and also cart($\mathcal{I}$) $\psi_{\sigma}$ $\phi$, so by assumption cart($\mathcal{I}$) $\mid_{\sigma} \psi$, but then by applying (3) again we get $\mathcal{I} \mid_{\sigma} \lceil\psi\rceil$.

We briefly pause to remark that Lemma 3 also shows that type inference for negation-free programs respects semantic equivalence: If $\phi$ and $\psi$ are semantically equivalent (under $\mathscr{S}$ and $\mathscr{H}$), then so are their types. This does, of course, not hold in the presence of negation, for given a type symbol u, we have $\lceil u(x)\rceil=u(x)$ yet $\lceil\neg\neg u(x)\rceil=\tau$.

Continuing with our development, we can now give the

Proof of Theorem 2. Assume $\mathscr{S}, \mathscr{H}, \phi \models \vartheta$; by Lemma 3 this means $\mathscr{S}, \mathscr{H}, \lceil\phi\rceil \vdash \lceil\vartheta\rceil$. But since $\vartheta$ is a type program we have $\lceil\vartheta\rceil=\vartheta$, which gives the result.

So far we have handled negation rather crudely, trivially approximating it by $\tau$. In fact, we can allow negations in type programs and amend the definition of $\lceil\bullet\rceil$ for negations to read $$\lceil\neg\varphi\rceil = \begin{cases} \neg\varphi & \text{if } \varphi \text{ is a type program} \\ \tau & \text{otherwise} \end{cases}$$

All the above results, including soundness and optimality, go through with this new definition, and the optimality and monotonicity results can be generalised to hold on all programs which contain only harmless negations, i.e. negations where the negated formula is a type program.

There is little hope for an optimality result on an even larger class of programs: Using negation, equivalence checking of two programs can be reduced to emptiness, and a program is empty iff its optimal typing is $\perp$. As equivalence is undecidable [23], any type system that is both sound and optimal for all programs would likewise have to be undecidable.

Our proposed definition of type programs is significantly more liberal than previous proposals in the literature. Frühwirth et al. in a seminal paper on types for Datalog [16] propose the use of conjunctive queries, with no negation, no disjunction, no equalities and no existentials.

As an example where the additional power is useful, consider a database that stores the marriage register of a somewhat traditionally minded community. This database might have types male and female, specified to be disjoint by the type hierarchy, and an extensional relation married with schema (female, male). (Note that this means that all male and female entities in the database are married, i.e. occur somewhere in the married relation.)

Using our above terminology, we have $\mathbb{T}$ ={male, female} and $\mathbb{E}=\mathbb{T} \cup$ {married}; $\mathscr{H}$ is $\forall x.\neg male(x) \vee \neg female(x)$.

Let us now define an intensional predicate spouse:

$$[spouse(x, y) \equiv married(x, y) \vee married(y, x)]spouse(x, y)$$

What is the type of spouse(x, y)? In the proposal of [16], we could only assign it $(female(x) \vee male(x)) \wedge (female(y) \vee male(y))$, so both arguments could be either male or female. By contrast, when employing our definition of type programs, the inferred type is $$(female(x) \wedge male(y)) \vee (male(x) \wedge female(y))$$

This accurately reflects that x and y must be of opposite sex. By properly accounting for equality, we can also infer that the query spouse(x, y) $\wedge$ $x \doteq y$ has type $\perp$ under the hierarchy: nobody can be married to themselves.

3. Representing Type Programs

For query optimisation and error checking, the single most important operation on types is containment checking, i.e. we want to decide, for two type programs $\vartheta$ and $\vartheta'$, whether $\mathscr{H} \wedge \vartheta[\,] \models \vartheta'$, which we will write $\vartheta[\,] \models_{\mathscr{H}} \vartheta'$ for short.

As mentioned in the introduction, we are often interested in checking whether a formula is unsatisfiable, that is whether it always gives an empty set of results regardless of the interpretation of the extensional relations. If such a formula occurs in a user program, it is regarded as a type error and the user is alerted to this fact; if it occurs during optimisation, it provides an opportunity for logical simplification. By the results of the previous section, a formula $\phi$ containing only harmless negations is unsatisfiable iff its type is equivalent to $\perp$, that is iff $\lceil\phi\rceil \models_{\mathscr{H}} \perp$.

Our type programs only make use of monadic extensionals, and their containment can be decided by a straightforward extension of the well-known decision procedure for monadic first order logic [6]. This construction, however, incurs an exponential blowup in formula size and does not directly yield a practical algorithm.

Under some mild restrictions on the class of type programs and the hierarchy, however, we can represent type programs in a compact manner that allows efficient containment checking in practice.

The class of type programs we deal with falls in between the two classes discussed in the previous section by allowing negation, but only in front of type symbols (and never before equalities). The definition of $\lceil\bullet\rceil$ is easily changed to accommodate this by setting $\lceil\neg\phi\rceil=\neg\phi$ if $\phi$ is of the form u(t) for $u \in \mathbb{T}$, and $\tau$ otherwise. We call a possibly negated application of a type symbol to a variable a type literal.

Furthermore, we require the hierarchy $\mathscr{H}$ to be of the form $\forall x.h(x)$, where h(x) does not contain quantifiers or equations, and only a single free variable x.

The basic unit of our representation are type propositions, which are Boolean combinations of type symbols, all of them applied to the same variable. In other words, a type proposition is a quantifier-free type program without fixpoint definitions or free relation variables, having precisely one free element variable. For example, the subformula h(x) of $\mathscr{H}$ is a type proposition.

A type proposition $\phi$ behaves essentially the same as the propositional formula $|\phi|$ that results from it by replacing every atom u(x) with the propositional letter u; for example, it is easily seen that $\forall x.y$ is (first order) valid iff $|\phi|$ is (propositionally) valid [20]. Hence we will sometimes identify the two notationally.

For example, if a and b are type symbols, then $a(x) \vee \neg b(x)$ is a type proposition with $|a(x) \vee \neg b(x)| = a \vee \neg b$.

For the restricted class of type programs under consideration, fixpoint definitions can be eliminated. To see this, recall that fixpoint definitions can be expanded into infinite disjunctions [10]. It thus suffices to show that the type programs without free relation variables and without fixpoint definitions (which we shall henceforth call flat) form a complete lattice, so that even a prima facie infinite disjunction can in fact be represented by a single formula.

Lemma 4. The flat type programs form a complete lattice under the order $\vDash_{\mathscr{H}}$.

Proof. The lattice structure is obviously given by the logical operations of conjunction and disjunction. To show completeness, we show that the set of flat type programs is finite (modulo equivalence under $\vdash_{\mathscr{H}}$).

Notice that every flat type program with m free element variables from $X=\{x_1, \ldots, x_m\}$ can be written in prenex form as $$\exists y_1, \ldots, y_n \cdot \bigvee_i \left[ \bigwedge_{1 \le j \le m} \psi_{i,j}(x_j) \wedge \bigwedge_{1 \le k \le n} \chi_{i,k}(y_k) \wedge \zeta \right]$$

for a set $Y=\{y_1, \ldots, y_n\}$ of element variables, where all the $\psi_{i,j}$ and $X_{i,k}$ are type propositions, and $\zeta$ is a conjunction of equations between element variables from $X \cup Y$.

Existentials distribute over disjunctions, and also over conjunctions if the variable they bind is only free in one of the conjuncts. Also, note that $\exists x.(x \doteq y \wedge \phi)$ is semantically equivalent to $\phi$ with y substituted for x. Hence we can further bring the type program into the form $$\bigvee_i \left[ \bigwedge_{1 \le j \le m} \psi'_{i,j}(x_j) \wedge \bigwedge_{1 \le k \le n} (\exists y_k \cdot \chi'_{i,k}(y_k)) \wedge \zeta' \right]$$

where $\zeta'$ now contains only variables from X. We will say that a formula of this shape is in solved form.

Clearly, there are only finitely many different formulae in solved form (modulo semantic equivalence), since there are only finitely many type propositions.

Notice that the set of flat type programs is no longer finite if we allow negated equalities. Indeed, for every natural number n, let $\epsilon_n$ be a formula asserting that there are at least n different individuals; for example, $\epsilon_2$ is $\exists x_1, x_2 . \neg x_1 \doteq x_2$. Then $\neg\epsilon_n \vDash_{\mathscr{H}} \neg\epsilon_{n+1}$ for every n, yet all the $\epsilon_n$ are semantically distinct; so the lattice is not even of finite height anymore.

Corollary 5. Every type program without free relation variables is semantically equivalent to a flat type program, and hence to a formula of monadic first order logic.

Here is an example of how a type program (with only a single disjunct) can be brought into solved form.

$\exists z \cdot a(x) \wedge z \doteq y \wedge b(y) \wedge c(x) \wedge x \doteq y \wedge$ $\neg c(z) \equiv \{\text{sorting by variable}\} \exists z \cdot a(x) \wedge c(x) \wedge b(y) \wedge x \doteq y \wedge$ $z \doteq y \wedge \neg c(z) \equiv \{\text{pushing in } \exists\} a(x) \wedge c(x) \wedge b(y) \wedge x \doteq y \wedge$ $\exists z \cdot z \doteq y \wedge \neg c(z) \equiv \{\text{eliminating } \doteq \text{under } \exists\} a(x) \wedge c(x) \wedge b(y) \wedge$ $x \doteq y \wedge \neg c(y) \equiv \{\text{sorting again}\} a(x) \wedge c(x) \wedge b(y) \wedge \neg c(y) \wedge x \doteq y$ We will now introduce data structures that represent formulae in solved form, and develop a containment checking algorithm that works directly on this representation.

We define an order on type propositions by taking $\phi <: \psi$ to mean $[\,] \vDash |h| \wedge |\phi| \rightarrow |\psi|$, where $|h|$ is the propositional formula corresponding to $\mathscr{H}$ as defined above. It is not hard to see that this holds precisely when $\phi \vDash_{\mathscr{H}} \psi$. In the remainder, we will identify type propositions that are equivalent under <: so that it becomes a partial order. Where needed, we make equivalence under <: explicit by writing it as $\equiv_{\mathscr{H}}$.

If t is a single type proposition and C a set of type propositions, we write $t <: C$ ($C <: t$) to mean that $t <: c$ ($c <: t$) for some $c \in C$.

The order <: can be extended to sets of type propositions by defining $C <: D$ to mean that for any $d \in D$ there is some $c \in C$ with $c <: d$. This order is clearly reflexive and transitive, and is anti-symmetric (and hence a partial order) on lean sets, i.e. sets C where $c <: c'$ for $c, c' \in C$ implies $c = c'$. One way of making a set of type propositions lean is to discard its non-minimal elements, which we write as min(C).

We can represent every disjunct of a formula in solved form using the following data structure:

Definition 1. An n-ary type tuple constraint, or TTC, $\tau$ is a structure $(t_1, \ldots, t_n | p | C)$ where each component $t_i$ is a type proposition, p is an equivalence relation over $\{1, \ldots, n\}$, C is a set of type propositions called inhabitation constraints, such that for all $1 \le i, j \le n$ with $i \sim_p j$ (i.e., i and j belong to the same partition of p) we have $t_i = t_j$, C is lean, for all $1 \le k \le n$ we have $C <: t_k$.

If p is a relation, we write $\bar{p}$ to mean the smallest equivalence relation containing it. The equivalence class of an element x under p is written $[x]_p$, where we omit the subscript p if it is clear from context. We call an equivalence relation q finer (or, more precisely, no coarser) than p if whenever $x \sim_q y$ then also $x \sim_p y$.

Whenever we have a pre-TTC $\tau = (t_1, \ldots, t_n | p | C)$ that does not satisfy one of the requirements, we can build a TTC that does by setting $$\|\tau\| := (\|t_1\|_{\bar{p}}, \ldots, \|t_n\|_{\bar{p}} | \bar{p} | \min(C \cup \{t_1, \ldots, t_n\}))$$

where $\|t_i\|_q = \bigwedge \{t_j | i \sim_q j\}$.

For a TTC $\tau = (t_1, \ldots, t_n | p | C)$, we define $\tau_i := t_i$, and $\tau_{i:=r}$ is the TTC resulting from $\tau$ by replacing the component $t_i$ (and every component $t_j$ where $i \sim_p j$) by r and adding r to the inhabitation constraints.

The formula represented by a TTC is easily recovered:

Definition 2. Given a list of n different element variables $x_1, \ldots, x_n$, we define the type program $[\tau](x_1, \ldots, x_n)$ corresponding to a TTC $\tau = (t_1, \ldots, t_n | p | C)$ as $$\left( \bigwedge_{1 \le i \le m} t_i(x_i) \right) \bigwedge \left( \bigwedge_{i \sim_p j} x_i \doteq x_j \right) \bigwedge \left( \bigwedge_{c \in C} \exists y \cdot c(y) \right)$$

A TTC is called degenerate if $\perp$ is among its inhabitation constraints; it represents an unsatisfiable formula. The equivalence relation is called trivial if it is in fact the identity relation id, and the set of inhabitation constraints is called trivial if it only constrains the component types to be inhabited. When writing a TTC, we will often leave out trivial partitionings or inhabitation constraints.

We extend the order <: to TTCs component-wise:

Definition 3. For two n-ary TTCs $\tau=(t_1, \ldots, t_n|p|C)$ and $\tau'=(t_1', \ldots, t_n'|p'|C')$ we define $\tau<:\tau'$ to hold iff for every $1\leq i\leq n$ we have $t_i<:t_i'$, p' is finer than p,

C<:C'.

It is routine to check that this defines a partial order with maximal element $[\![\tau^{TTC}=(\tau, \ldots, \tau)]\!]$ $T^{TTC}=(T, \ldots, T)$, with binary meets defined by $$(t_1, \ldots, t_n|p|C) \barwedge (t_1', \ldots, t_n'|p'|C')=\|(t_1 \wedge t_1', \ldots, t_n \wedge t_n'|p \cup p'|C \cup C')\| \tag{4}$$

Since all type programs can be brought into solved form, we can represent them as sets of TTCs.

Definition 4. A lean set of non-degenerate TTCs is called a typing.

The formula represented by a typing is $$[T] := \bigvee_{\tau\in T} [\tau]$$

The order <: is extended to typings by defining T<:T' to hold if, for every $\tau \in T$ there is a $\tau' \in T'$ with $\tau<:\tau'$.

To convert any set of TTCs into a typing we can eliminate all non-maximal and degenerate TTCs from it; this operation we will denote by $\max_\perp$.

The order on typings is again a partial order with least element $\emptyset$ and greatest element $[\![\{\tau^{TTC}\}]\!]$ $\{T^{TTC}\}$. Binary meets can be defined point-wise as $$T\barwedge T'=\max_\perp(\{\tau \barwedge \tau' | \tau \in T, \tau' \in T'\}) \tag{5}$$

and joins are given by $$T \veebar T'=\max_\perp(T \cup T') \tag{6}$$

We will now show that every type program can be translated to a typing. We already have enough structure to model conjunction and disjunction; existential quantification is also not hard to support.

Definition 5. The i-th existential of a TTC $\tau=(t_1, \ldots, t_n|p|C)$, where $1\leq i\leq n$, is defined as $$\exists_i(\tau):=(t_1, \ldots, t_{i-1}, t_{i+1}, \ldots, t_n|p'|\min(C \cup \{t_i\}))$$

where p' is the restriction of p to $\{1, \ldots, i-1, i+1, \ldots, n\}$.

The existential of a typing is defined pointwise:

$$\exists_i(T):=\max_\perp\{\exists_i(\tau)|\tau \in T\}$$

To see that this models the existential quantifier on type programs, we can easily convince ourselves of the following:

Lemma 6. Let $\tau$ be an n-ary TTC, $\mathcal{I}$ an interpretation and $\sigma$ a statement. Then $\mathcal{I} \mid_\sigma [\exists_i(\tau)]$ iff there is a domain element d such that $\mathcal{I} \models_{\sigma, x_i:=d} [\tau]$. An analogous statement holds for typings.

Although typings cannot directly represent type programs with fixpoint definitions or free relation variables, we can translate every closed type program to a typing by eliminating definitions. Let us start with a translation relative to an assignment to free relation symbols.

Definition 6. Let $\phi$ be a type program without fixpoint definitions containing the intensional relation variables $r_1, \ldots, r_m$ and the element variables $x_1, \ldots, x_n$. We translate it to a mapping $\langle \phi \rangle$ : Typing$^m$→Typing by recursion on the structure of $\phi$:

$$\langle \perp \rangle(\vec{T})=\emptyset$$

$$\langle x_i \doteq x_j \rangle(\vec{T})=\{(\tau, \ldots, \tau|\underline{\{\{i,j\}\}})\}$$

$$\langle u(x_j) \rangle(\vec{T})=\{\tau^{TTC}_{j:=u}\}$$

$$\langle \neg u(x_j) \rangle(\vec{T})=\{\tau^{TTC}_{j:=\neg u}\}$$

$$\langle r_i(\vec{x}) \rangle(\vec{T})=T_i$$

$$\langle \psi \wedge \chi \rangle(\vec{T})=\langle \psi \rangle(\vec{T}) \barwedge \langle \chi \rangle(\vec{T})$$

$$\langle \psi \vee \chi \rangle(\vec{T})=\langle \psi \rangle(\vec{T}) \veebar \langle \chi \rangle(\vec{T})$$

$$\langle \exists x_i.\psi \rangle(\vec{T})=\exists_i(\langle \psi \rangle(\vec{T}))$$

It is easy to check that $\langle \phi \rangle$ is a monotonic mapping for every $\phi$ with respect to the order <:, and since the set of typings is finite its least fixpoint can be computed by iteration. Thus we can translate every type program $\phi$ which does not have free relation variables into a typing $\langle \phi \rangle$ which represents it:

Lemma 7. For every type program $\phi$ without free relation variables, we have $\phi \dashv\vdash \mathscr{H} [\langle \phi \rangle]$.

Proof Sketch. In fact, we can show that, for any type program $\phi$ with m free relation variables and every m-tuple $\vec{T}$ of typings, we have the equivalence $\phi([\vec{T}]) \dashv\vdash [\langle \phi \rangle(\vec{T})]$, where $[\vec{T}]$ is the m-tuple of type programs we get from applying [•] to every component of $\vec{T}$.

This can be proved by structural induction on $\phi$ by showing that $[\langle \bullet \rangle]$ commutes with the logical operators (using Lemma 6 for the case of existentials) and with fixpoint iteration. The lemma then follows for the case m=0.

4. Containment Checking

We are now going to investigate the relation between the orders <: (component-wise or syntactic subtyping) and $\models_{\mathscr{H}}$ (semantic subtyping). The former is convenient in that it can be checked component-wise and only involves propositional formulae, so it would be nice if we could establish that $T_1<:T_2$ iff $[T_1] \mid_{\mathscr{H}} [T_2]$.

Unfortunately, this is not true. The ordering <: is easily seen to be sound in the following sense:

Theorem 8. For any two typings T and T', if T<:T' then $[T] \models_{\mathscr{H}} [T']$.

However, it is not complete. Consider, for example, the typings $T=\{(b \vee c, a)\}$ and $T'=\{(a \vee b, a), (c \vee d, a)\}$. Clearly we have $[T] \vdash_{\mathscr{H}} [T']$, yet $T \not<: T'$.

If we interpret type symbols as intervals of real numbers, this example has an intuitive geometric interpretation, shown in FIG. 4.

The individual TTCs then become rectangles in the two-dimensional plain, and it is easy to see that the single TTC in T (depicted by the single rectangle in heavy outline filled with vertical lines) is contained in the union of the TTCs in T' (the two rectangles filled with slanted lines), but not in either one of them in isolation.

A similar problem can arise from the presence of equality constraints: Consider the typings $T=\{(a \vee b, a \vee b|\{\{1, 2\}\})\}$ and $T'=\{(a, a), (b, b)\}$. The former appears in FIG. 5 as a heavy slanted line, which is not contained in either of the two squares representing the TTCs in T', but only in their union.

Intuitively, the problem is that <: tests containment of TTCs in isolation, whereas the semantic inclusion check considers containments between sets of TTCs.

The following lemma paves the way for a solution:

Lemma 9. The mapping $[\bullet]$ is the lower adjoint of a Galois connection, i.e. there is a mapping $(|\bullet|)$ from type programs to typings such that $$[T] \models_{\mathscr{H}} \vartheta \text{ iff } T <: (|\vartheta|)$$

Proof. As we have established, typings and type programs form complete lattices under their respective orders. Since $[\bullet]$ distributes over joins it must be the lower adjoint of a Galois connection between these lattices.

An immediate consequence of this is that $[T_1] \vdash_{\mathscr{H}} [T_2]$ implies $T_1 <: (|[T_2]|)$. To check, then, whether $T_1$ is semantically contained in $T_2$, we compute $(|[T_2]|)$ and check for component-wise inclusion.

One possible implementation of $(|\bullet|)$ comes directly from the definition of the Galois connection: For any type program $\vartheta$, $(|\vartheta|)$ is the greatest typing T such that $[[T] \vdash_{\mathscr{H}} \vartheta]$ $[T] \models_{\mathscr{H}} \vartheta$, and since there are only finitely many typings and containment is decidable we could perform an exhaustive search to find this T.

Clearly, this algorithm is not ideal, since one of our goals is to avoid having to explicitly decide the relation $\vdash_{\mathscr{H}}$. Inspiration for a better solution comes from a perhaps somewhat unexpected direction, namely the theory of Boolean function minimisation:

Quine [22] introduces an algorithm whose first part determines the set of prime implicants of a Boolean formula, which are conjunctive formulae such that every conjunctive formula that implies the original formula implies one of the prime implicants.

Generalising from conjunctions to TTCs and from propositional formulae to typings, we will introduce a saturation mapping sat that generates the set of all prime implicant TTCs for a typing, which are TTCs such that every TTC that (semantically) entails the typing entails one of them component-wise. Hence whenever $[T_1] \models_{\mathscr{H}} [T_2]$ we have $T_1 <: \mathrm{sat}(T_2)$, so sat is an implementation of $(|[\bullet]|)$. The saturation mapping also preserves semantics, so the other direction of the implication holds as well.

We can follow Quine's definitions and proofs almost paragraph by paragraph, starting with the generalisation of the consensus operation:

Definition 7. The consensus $\tau \oplus_J \tau'$ over J of two n-ary TTCs $\tau$ and $\tau'$, where $J \subseteq \{1, \ldots, n\}$ is an index set, is defined by $$(t_1, \ldots, t_n \mid p \mid C) \oplus_J (t_1', \ldots, t_n' \mid p' \mid C') = \|(u_1, \ldots, u_n \mid p \cup p' \cup J \times J \mid C \cup C')\|$$

where $$u_i = \begin{cases} \bigwedge_{j \in J} t_j \vee \bigwedge_{j \in J} t_j' & \text{if } i \in J \\ t_i \wedge t_i' & \text{otherwise} \end{cases}$$

We will sometimes write $\bigwedge_J \tau$ for $\bigwedge_{j \in J} t_j$.

Roughly, the consensus operation equates all columns in J and preserves all other equalities and inhabitation constraints of its operands, takes disjunctions over the columns in J, and conjunctions over all the others.

For example, in the example shown in FIG. 5 we can take the consensus of (a, a) and (b, b) over $J=\{1, 2\}$ to obtain the TTC $(a \vee b, a \vee b \mid \{\{1, 2\}\})$, which is precisely the missing piece to show that T is a subtype of T'.

In the particular case where $J=\{j\}$ is a singleton set, and both partitions and inhabitation constraints are trivial, the consensus takes conjunctions on all columns except j, where it takes a disjunction. This is a generalisation of the behaviour of the consensus operator used in the minimisation of Boolean functions.

For example, in FIG. 4 we can take the consensus of $(a \vee b, a)$ and $(c \vee d, a)$ on $J=\{1\}$ to obtain the TTC $(a \vee b \vee c \vee d, a)$ which covers $(b \vee c, a)$.

We need another kind of consensus to deal with inhabitation constraints:

Definition 8. The existential consensus of two n-ary TTCs $\tau$ and $\tau$ is defined by $$(t_1, \ldots, t_n \mid p \mid C) \oplus_\exists (t_1', \ldots, t_n' \mid p' \mid C') = \|(t_1 \wedge t_1', \ldots, t_n \wedge t_n' \mid p \cup p' \mid C \vee C')\|$$

where $C \vee C' = \{c \vee c' \mid c \in C, c' \in C'\}$.

To see why this is necessary, assume we have type symbols a, b, c with $\mathscr{H} \vdash \forall x.a(x) \vee b(x) \rightarrow c(x)$, and consider typings $T=\{(c \mid id \mid a \vee b)\}$ and $T'=\{(c \mid id \mid a), (c \mid id \mid b)\}$. Clearly, $[T]=c(x_1) \wedge \exists z.(a(z) \vee b(z))=[T']$, yet $T \not<: T'$ since $\{a \vee b\} \not<: \{a\}$ and $\{a \vee b\} \not<: \{b\}$. However, if we add the existential consensus $(c \mid id \mid a \vee b)$ to T', we will be able to prove that $T <: T'$.

It is not hard to verify that adding the consensus of two TTCs to a typing does not change its semantics.

Lemma 10. For two TTCs $\tau$, $\tau$ and an index set J we have $[\tau \oplus_J \tau'] \vdash_{\mathscr{H}} [\{\tau, \tau'\}]$ and $[\tau \oplus_\exists \tau'] \vdash_{\mathscr{H}} [\{\tau, \tau'\}]$.

Proof Sketch. Clearly, if $J=\emptyset$ the consensus is just the meet, so nothing needs to be proved.

Otherwise, let $\mathcal{I}$ and $\sigma$ be given such that $\mathcal{I} \models_\sigma [\tau \oplus_J \tau']$. Then, for some $i \in J$, either $\mathcal{I} \mid_\sigma \bigwedge_{j \in J} t_j(x_i)$ or $\mathcal{I} \mid_\sigma \bigwedge_{j \in J} t_j'$; in the former case $\mathcal{I} \models_\sigma [\tau]$, and in the latter case $\mathcal{I} \vdash_\sigma [\tau']$.

For the existential consensus, assume $\mathcal{I} \mid_\sigma [\tau \oplus_\exists \tau']$ and further assume there is some inhabitation constraint c of $\tau$ such that $\mathcal{I} \not\models \lceil y.c(y)$ (for otherwise $\mathcal{I} \vdash_\sigma [\tau]$ is immediate). We must have $\mathcal{I} \models \exists y.c(y) \vee c'(y)$ for all inhabitation constraints c' of $\tau'$, so certainly $\mathcal{I} \mid \exists y.c'(y)$. We then easily see that $\mathcal{I} \models_\sigma [\tau']$.

Remember that typings do not contain non-maximal elements. The following result shows that we do not lose anything by eliminating them.

Lemma 11. Consensus formation is monotonic in the sense that for TTCs $\sigma$, $\sigma'$, $\tau$, $\tau'$ with $\sigma <: \sigma'$ and $\tau <: \tau'$ and for an index set J we have $\sigma \oplus_J \tau <: \sigma' \oplus_J \tau'$ and $\sigma \oplus_\exists \tau <: \sigma' \oplus_\exists \tau'$ Proof Sketch. The components of the two TTCs are combined using conjunction and disjunction, which are monotonic with respect to subtyping, and the partitionings and inhabitation constraints are combined using set union which is also monotonic.

Definition 9. An n-ary typing T is said to be saturated if the consensus of any two TTCs contained in it is covered by the typing; i.e. for any $\tau, \tau' \in T$ and any index set $J \subseteq \{1, \ldots, n\}$ we have $\tau \oplus_J \tau' <: T$ and $\tau \oplus_\exists \tau' <: T$.

Lemma 12. Every typing T can be converted into a semantically equivalent, saturated typing sat(T) by exhaustive consensus formation.

Proof. We use Algorithm 2 to collect all consensus TTCs of two given TTCs. As shown in Algorithm 1, this is performed for every pair of TTCs in the typing, and this procedure is repeated until a fixpoint is reached.

Notice that in each iteration (except the last) the set of TTCs covered by the typing becomes larger, and since there are only finitely many TTCs, the termination condition must become true eventually.

We now generalise the concepts of implicants and prime implicants.

Definition 10. A TTC $\tau$ is an implicant for a typing T' if we have $[\tau] \models_{\mathscr{H}} [T']$; it is a prime implicant if it is a <:-maximal implicant.

More explicitly, a TTC $\pi$ is a prime implicant for a typing T' if

1. $\pi$ is an implicant of T'
2. For any $\tau$ with $\pi<:\tau$ and $[\tau] \models_{\mathscr{H}} [T']$, we have $\tau<:\pi$.

The second condition is equivalent to saying that for any $\tau$ with $\tau<:\tau$ and $\tau \not<:\pi$ we have $[\tau] \not\models_{\mathscr{H}} [T]$.

Lemma 13. Every implicant implies a prime implicant.

Proof. The set of all implicants of a typing is finite, so for any implicant $\tau$ there is a maximal implicant $\pi$ with $\tau<:\pi$, which is then prime by definition.

Remark 14. If $\pi$ is a prime implicant of T, then $\pi<:T$ iff $\pi \in T$.

Proof. The direction from right to left is trivial. For the other direction, suppose $\pi<:T$, i.e. $\pi<:\pi'$ for some $\pi' \in T$. Certainly $[\pi'] \vdash_{\mathscr{H}} [T]$, so $\pi'<:\pi$ since $\pi$ is prime. But this means that $\pi=\pi' \in T$.

We want to show that sat(T) contains all prime implicants of T, so we show that saturation can continue as long as there is some prime implicant not included in the saturated set yet.

Lemma 15. If there is a prime implicant $\pi$ of T with $\pi \notin T$, then T is not saturated.

Proof. Let $\pi$ be a prime implicant of T with $\pi \notin T$. Consider the set $$M:=\{\tau|[\tau] \models_{\mathscr{H}} [\pi], \tau \not<:T\}$$

This set is not empty (it contains $\pi$ by the preceding remark) and it is finite, so we can choose a <:-minimal element $\psi \in M$.

The proof proceeds by considering three cases. In the first, we shall show that a consensus step is possible, thus proving that T is not saturated. In the second, we show that an existential consensus step can be made, again proving non-saturation. Finally, we show that either the first or second case must apply, as their combined negation leads to a contradiction.

Assume there is an index i for which $\psi_i \equiv_{\mathscr{H}} r' \vee r''$ for two r', r'' neither of which equals $\psi_i$.

Then we form $\psi':=\psi_{i:=r'}$ and $\psi'':=\psi_{i:=r''}$. Observe that $\psi$ and $\psi$ are strictly smaller than $\psi$, so they cannot be in M. They both, however, entail $\pi$, so there must be $\phi'$, $\phi'' \in T$ with $\psi'<:\phi'$ and $\psi<:\phi''$.

Note that $\psi=\psi' \oplus_{[i]} \psi''$, where [i] is the equivalence class of i in $\psi$. By Lemma 11, this means that $\psi<:\phi' \oplus_{[i]} \phi''$, and since $\psi \not<:T$ we also have $\phi' \oplus_{[i]} \phi'' \not<:T$, which shows that T is not saturated.

Assume for some $c \in C$, where C is the set of inhabitation constraints of $\psi$, we have $c \equiv_{\mathscr{H}} r' \vee r''$ for two r', r'' neither of which equal c.

We form $\psi$ from $\psi$ by setting the inhabitation constraints to $C\backslash\{c\} \cup \{r'\}$ and minimising, and similarly for $\psi''$. As above, those two are strictly smaller than $\psi$ and we can find $\phi'$ and $\phi''$. The proof goes through as in the previous case, since it is easy to see that $\psi=\psi' \oplus_{\exists} \psi''$.

Otherwise, for any index i and r', r'' with $\psi_i \equiv_{\mathscr{H}} r' \vee r''$ we have either $\psi_i \equiv_{\mathscr{H}} r'$ or $\psi_i \equiv_{\mathscr{H}} r''$ (i.e. every $\psi_i$ is join-irreducible) and likewise for all $c \in C$.

We will show that in this case $\psi<:T$, contrary to our assumptions. We know that $[\psi] \mid_{\mathscr{H}} [T]$, so any interpretation $\mathcal{I}$ and assignment $\sigma$ with $\mathcal{I} \vdash_{\mathscr{H}}$ and $\mathcal{I} \vdash_{\sigma} [\psi]$ will satisfy some TTC $\tau \in T$. Put differently, if $\mathcal{I} \models_{\sigma} (\mathscr{H} \wedge \psi)$ $(x_i)$ for all i and $\mathcal{I} \models \exists y.(\mathscr{H} \wedge c)$ (y) for all inhabitation constraints c and moreover a satisfies the partition of $\psi$, then we will find $\tau \in T$ with $\mathcal{I} \models_{\tau} [\tau]$.

Observe that for every i the (propositional) formula $|h| \wedge |\psi_i|$ can be written as a conjunction $l_{i,1} \wedge \ldots \wedge l_{i,m_i}$ of type literals. We can moreover assume that every type symbol occurs in precisely one of these literals, for if, say, type t does not occur, then $l_{i,1} \wedge \ldots \wedge l_{i,m_i} \wedge t \vee l_{i,1} \wedge \ldots \wedge l_{i,m_i} \vee \neg$ is a join reduction of $|h| \wedge |\psi_i|$.

Let such a decomposition be fixed and let $L_i:=\{l_{i,1}, \ldots, l_{i,m_i}\}$. Since $\psi_i=\psi_j$ whenever i and j are in the same partition, we can clearly choose the decomposition such that $L_i=L_j$ in this case. Likewise, for every inhabitation constraint c we can write $|h| \wedge |c|$ as $l_{c,1} \wedge \ldots \wedge l_{c,m_c}$, and define $L_c$ by analogy.

We define an interpretation $\mathcal{I}$ over the domain $\{x_{[1]}, \ldots, x_{[n]}\} \cup C$ of variables modulo the partition of $\psi$ plus the inhabitation constraints by $$\mathcal{I}(b)=\{x_{[i]}|b \in L_i\} \cup \{c|b \in L_c\}$$

for every type symbol b. The assignment is simply defined by $\sigma(x_i)=x_{[i]}$.

It is easy to see that $x_{[i]} \in [[l]]$ iff $l \in L_i$ for all $1 \le i \le n$, and $c \in [[l]]$ iff $l \in L_c$ for all inhabitation constraints c, from which we deduce $\mathcal{I} \vdash_{\sigma} (\mathscr{H} \wedge \psi_i)$ $(x_i)$ for all i, and $\mathcal{I} \models \exists y.(\mathscr{H} \wedge)$ (y) for all inhabitation constraints c. By definition, $\sigma$ satisfies the partition of $\psi$. So we have some $\tau \in T$ with $\mathcal{I} \mid_{\sigma} [\tau]$.

We claim that $\psi<:T$.

Indeed, let an index $1 \le i \le n$ be given. Then we can write $\tau_i$ as a disjunction of conjunctions, such that one of its disjuncts, of the form $l_{i,1}' \wedge \ldots \wedge l_{i,m_i}'$, is satisfied under $\mathcal{I}$ and $\sigma$, meaning that $x_{[i]} \in [[l_{i,j}']]\mathcal{I}$ for all j, so all the $l_{i,j}'$ are in fact in $L_i$, so $\psi_i<:\tau_i$.

Since $\sigma$ satisfies the partition of $\tau$, this partition must be finer than the partition of $\psi$.

Finally, let an inhabitation constraint d of $\tau$ be given. Since $\mathcal{I} \models \exists y.(\mathscr{H} \wedge)$ (y), the interpretation of $\mathscr{H} \wedge d$ cannot be empty. As above, we can write $\mathscr{H} \wedge d$ in a disjunctive form such that all the literals in one of its disjuncts are non-empty in $\mathcal{I}$. So there must be some domain element that occurs in the denotation of all these literals. If it is one of the $x_{[i]}$, then we have $\psi_i<:d$, which implies $c<:d$ for some inhabitation constraint c of $\psi$; if it is an inhabitation constraint c, then we have $c<:d$ directly.

Taking these facts together, we get $\psi<:\tau$, whence $\psi<:T$. This contradicts our assumption, and we conclude that this subcase cannot occur.

Now we can declare victory:

Theorem 16. If $[T_1] \models_{\mathscr{H}} [T_2]$, then $T_1<:sat(T_2)$.

Proof. Assume $[T_1] \vdash_{\mathscr{H}} [T_2]$ and let $\tau \in T_1$ be given. Then $[\tau] \models_{\mathscr{H}} [T_2]$, so certainly $[\tau] \models_{\mathscr{H}} [sat(T_2)]$, since saturation does not change the semantics. By Lemma 13 this means that there is a prime implicant $\pi$ of $sat(T_2)$ with $\tau<:\pi$. By Lemma 15 we must have $\pi \in sat(T_2)$, so $\tau<:sat(T_2)$. Since this holds for any $\tau \in T_1$ we get $T_1<:sat(T_2)$.

5. Implementation

It is not immediately clear that the representation for type programs proposed in the preceding two sections can be implemented efficiently. While the mapping $\lceil\bullet\rceil$ from programs to type programs is, of course, easy to implement and linear in the size of the program, the translation of type programs into their corresponding typings involves fixpoint iterations to eliminate definitions. Saturation is also potentially very expensive, since we have to compute the consensus on every combination of columns for every pair of TTCs in a typing, and repeat this operation until a fixpoint is reached.

We report in this section on our experience with a prototype implementation based on Semmle's existing type checking technology as described in [13]. The type checker computes typings for programs and immediately proceeds to saturate them to prepare for containment checking. It uses a number of simple heuristics to determine whether a consensus operation needs to be performed. This drastically reduces the over-head of saturation in practice and makes our type inference algorithm practically usable.

TTCs can be compactly represented by encoding their component type propositions as binary decision diagrams. The same can be done for the hierarchy, so checking containment of type propositions can be done with simple BDD operations.

As with any use of BDDs, it is crucial to find a suitable variable order. We choose a very simple order that tries to assign neighbouring indices to type symbols that appear in the same conjunct of the hierarchy formula $\mathscr{H}$. For example, if the hierarchy contains a subtyping statement $u_1(x) \rightarrow u_2(x)$ or a disjointness constraint $\neg(u_1(x) \wedge u_2(x))$, then $u_1$ and $u_2$ will occupy adjacent BDD variables. This heuristic is simple to implement and yields reasonable BDD sizes as shown below.

To mitigate the combinatorial explosion that saturation might bring with it, we avoid useless consensus formation, i.e. we will not form a consensus $\tau \oplus \tau'$ if $\tau \oplus \tau' <: \{\tau, \tau'\}$ or $\tau \oplus \tau'$ is degenerate. The following lemma provides a number of sufficient conditions for a consensus to be useless:

Lemma 17. Let $\tau=(t_1, \ldots, t_n|p|C)$ and $\tau'=(t_1', \ldots, t_n'|p'|C')$ be two TTCs and $J \subseteq \{1, \ldots, n\}$ a set of indices. Then the following holds:

1. If $N^{\perp}:=\{i|t_i \wedge t_i'=\perp\} \supseteq J$ then $\tau \oplus_J \tau'$ is degenerate.
2. If $\bigwedge_{\in J} t_j=\perp$ or $\bigwedge_{\in J} t_j'=\perp$, then $\tau \bigwedge_{J'} \tau' <: \{\tau, \tau'\}$ for any $J' \supseteq J$.
3. If we have $l \notin J$ with $\bigwedge_{j \in J} t_j <: t_l$ and $\bigwedge_{j \in J} t_j' <: t_j'$, then $\tau \oplus_{J \cup \{l\}} \tau' <: \tau \oplus_J \tau'$.
4. If $\bigwedge_{j \in J} t_j <: \bigwedge_{j \in J} t_j'$ or vice versa, then $\tau \oplus_J \tau' <: \{\tau, \tau'\}$.
5. For $j \in J$, $j' \notin J$ with $j \sim_{\overline{p \cup p'}} j'$ we have $\tau \oplus_J \tau' <: \tau \oplus_{J \cup \{j'\}} \tau'$.
6. If $N^{\perp} \neq \emptyset$, then $\tau \oplus_{\exists} \tau'$ is degenerate.

Proof. Recall that $\tau \oplus_J \tau' = \|(u_1, \ldots, u_n|p \cup p' \cup J \times J|C \cup C')\|$ where $$u_i = \begin{cases} \bigwedge_{j \in J} t_j \vee \bigwedge_{j \in J} t_j' & \text{if } i \in J \\ t_i \wedge t_i' & \text{otherwise} \end{cases}$$

We prove the individual claims:

1. Indeed, assume $k \in N^{\perp} \setminus J$, then $u_k=t_k \wedge t_k'=\perp$.
2. Assume, for example, $\bigwedge_{j \in J} t_j=\perp$ and let $J' \supseteq J$ be given, then $\bigwedge_{\in J'} t_j=\perp$, so $u_i=\bigwedge_{j \in J'} t_j' <: t_i'$ if $i \in J$, and $u_i=t_i \wedge t_i' <: t_i'$ otherwise, so $\tau \oplus_{J'} \tau' <: \tau'$. If the other disjunct is $\perp$, we see that $\tau \oplus_{J'} \tau' <: \tau$ by a similar argument.
3. Note that $\bigwedge_{j \in J \cup \{l\}} t_j=\bigwedge_{j \in J} t_j$ and $\bigwedge_{j \in J \cup \{l\}} t_j'=\bigwedge_{\in J} t_j'$, so $\tau \oplus_{J \cup \{l\}} \tau' <: \tau \oplus_J \tau'$.
4. The argument is similar to 2.
5. Writing $J'$ for $J \cup \{j'\}$, we see that the partitioning will be the same for $J$ and $J'$. Now consider the ith component of $\tau \otimes_J \tau'$. If $i \sim i'$ for some $i' \in J$, then $i \sim j'$, so we have $$(\tau \otimes_J \tau')_i=(\bigwedge_{j \in J} t_j \vee \bigwedge_{j \in J} t_j') \wedge \bigwedge \{t_k \wedge t_k' | k \sim i, k \notin J\}=$$

$$(\bigwedge_{j \in J} t_j \vee \bigwedge_{j \in J} t_j') \wedge (t_{j'} \wedge t_{j'}') \wedge \bigwedge \{t_k \wedge t_k' | k \sim i, k \notin J'\}=$$

$$(t_{j'}' \wedge \bigwedge_{j \in J'} t_j \vee t_{j'} \wedge \bigwedge_{j \in J'} t_j') \wedge \bigwedge \{t_k \wedge t_k' | k \sim i, k \notin J'\} <:$$

$$(\bigwedge_{j \in J'} t_j \vee \bigwedge_{j \in J'} t_j') \wedge \bigwedge \{t_k \wedge t_k' | k \sim i, k \notin J'\}= (\tau \oplus_{J'} \tau')_i$$

Otherwise we have $(\tau \otimes_J \tau')_i=(\tau \otimes_{J'} \tau')_i$, so overall $\tau \otimes_J \tau' <: \tau \otimes_{J'} \tau'$.

6. Obvious, since the components of $\tau \oplus_{\exists} \tau'$ are obtained by forming the meet.

This suggests an improved implementation of Algorithm 2, shown in two parts as Algorithm 3 and Algorithm 4, which straightforwardly exploit the above properties to avoid performing useless consensus operations whose result would be discarded by the $\max_{\perp}$ operator anyway. In the latter, we make use of an operation PART(υ, i) which returns the equivalence partition index i belongs to in TTC υ.

To show that these improvements make our type inference algorithm feasible in practice, we measure its performance on some typical programs from our intended application domain. The Datalog programs to be typed arise as an intermediate representation of programs written in a high-level object-oriented query language named .QL [14, 15], which are optimised and then compiled to one of several low-level representations for execution.

We measure the time it takes to infer types for the 89 queries in the so-called "Full Analysis" that ships with our source code analysis tool SemmleCode. These queries provide statistics and overview data on structural properties of the analysed code base, compute code metrics, and check for common mistakes or dubious coding practices.

A type inference for the query being compiled is performed at three different points during the optimisation process, giving a total of 267 time measurements. All times were measured on a machine running a Java 1.6 virtual machine under Linux 2.6.28-13 on an Intel Core2 Duo at 2.1 GHz with four gigabytes of RAM, averaging over ten runs, and for each value discarding the lowest and highest reading.

Of the 267 calls to type inference, 65% finish in 0.5 seconds or less, 71% take no more than one second, 93% no more than two, and in 98% of the cases type inference is done in under three seconds. Only two type inferences take longer than four seconds, at around 4.5 seconds each.

The size of the programs for which types are inferred varies greatly, with most programs containing between 500 and 1500 subterms, but some programs are significantly larger at more than 3000 subterms. Interestingly, program size and type inference time are only very weakly correlated ($\rho<0.4$), and the correlation between the number of stratification layers (which roughly corresponds to the number of fixpoint computations to be done) and type inference time is also not convincing ($\rho<0.6$).

Figure 6:
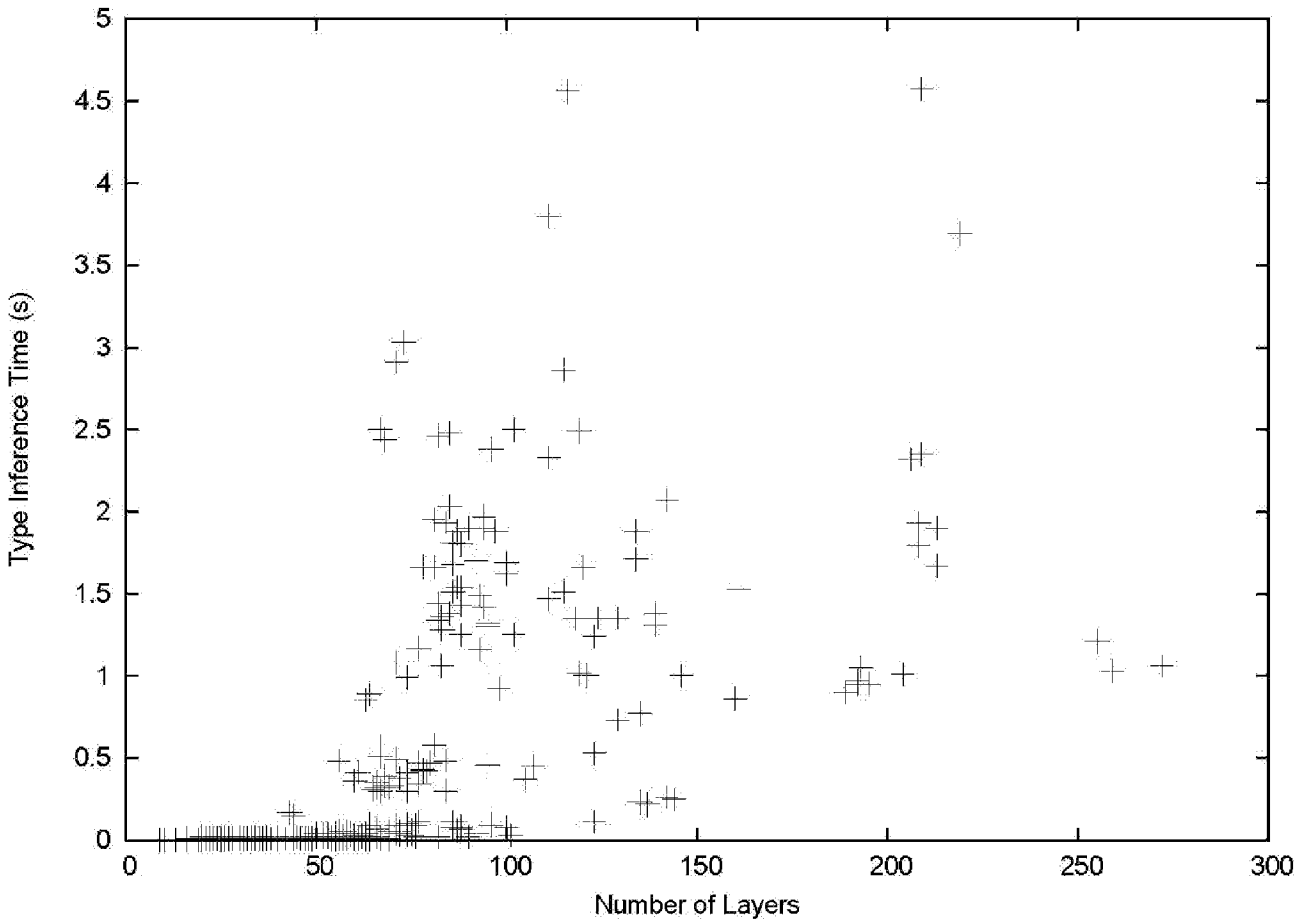
FIG. 6 is a plot illustrating the type inference time plotted on the y-axis versus the depth (i.e., number of layers) of the program on the x-axis.

The low correlation is evident in FIG. 6 which shows the type inference time plotted on the y-axis versus the depth (i.e., number of layers) of the program on the x-axis. In particular, the two cases in which type inference takes longer than four seconds are both of medium size and not among the deepest either.

This suggests that the asymptotic behaviour of the algorithm in terms of input size is masked by the strong influence of implementation details (at least for the kind of programs we would expect to deal with in our applications), and we can expect significant performance gains from fine tuning the implementation.

Our experiments also show that saturation, while extremely expensive in theory, is quite well-behaved in practice: in 78% of all cases, no new TTCs are added during the first iteration of Algorithm 1, so the typing is already saturated. In another 17% of all cases we need only one more iteration, and we almost never (≈0.01%) need to do more than four iterations.

Although in every individual iteration we potentially have to take the consensus over every combination of columns, our heuristics manage to exclude all combinations of more than one column in 94% of all cases, and sometimes (14%) can even show that no consensus formation is needed at all.

Since our type inference algorithm makes heavy use of BDDs, some statistics about their usage may also be of interest. We use about 300 BDD variables (one for every type symbol), with most of the BDDs constructed during type checking being of rather moderate size: the BDD to represent the type hierarchy (which encodes about 800 constraints automatically derived during translation from .QL to Datalog) occupies around 4000 nodes, while the BDDs for individual type propositions never take more than 100 nodes.

While we have anecdotal evidence to show that the optimisation techniques we have presented in earlier work [13] benefit greatly from combining them with the richer type hierarchies our type system supports, we leave the precise investigation of this matter to future work.

6. Benefits

The present invention handles negated types accurately. Also, the present invention handles inhabitation constraints (i.e., existentials in type programs) precisely.

We achieve pleasing theoretical properties and can support a rich language of type constraints by sacrificing polynomial time guarantees, although our experiments show that this is a reasonable tradeoff for our application area.

While the performance of our prototype implementation is promising, other implementation approaches certainly exist and may be worth exploring. Bachmair et al. [4] develop a decision procedure for monadic first order logic based on the superposition calculus. Since type programs can readily be expressed as monadic first order formulae, their algorithm could be used to decide type containment. Another possibility would be to use Ackermann's translation from monadic first order logic to equality logic [2], and then employ a decision procedure for this latter logic.

7. Review of High Level Flow Diagrams

Figure 7:
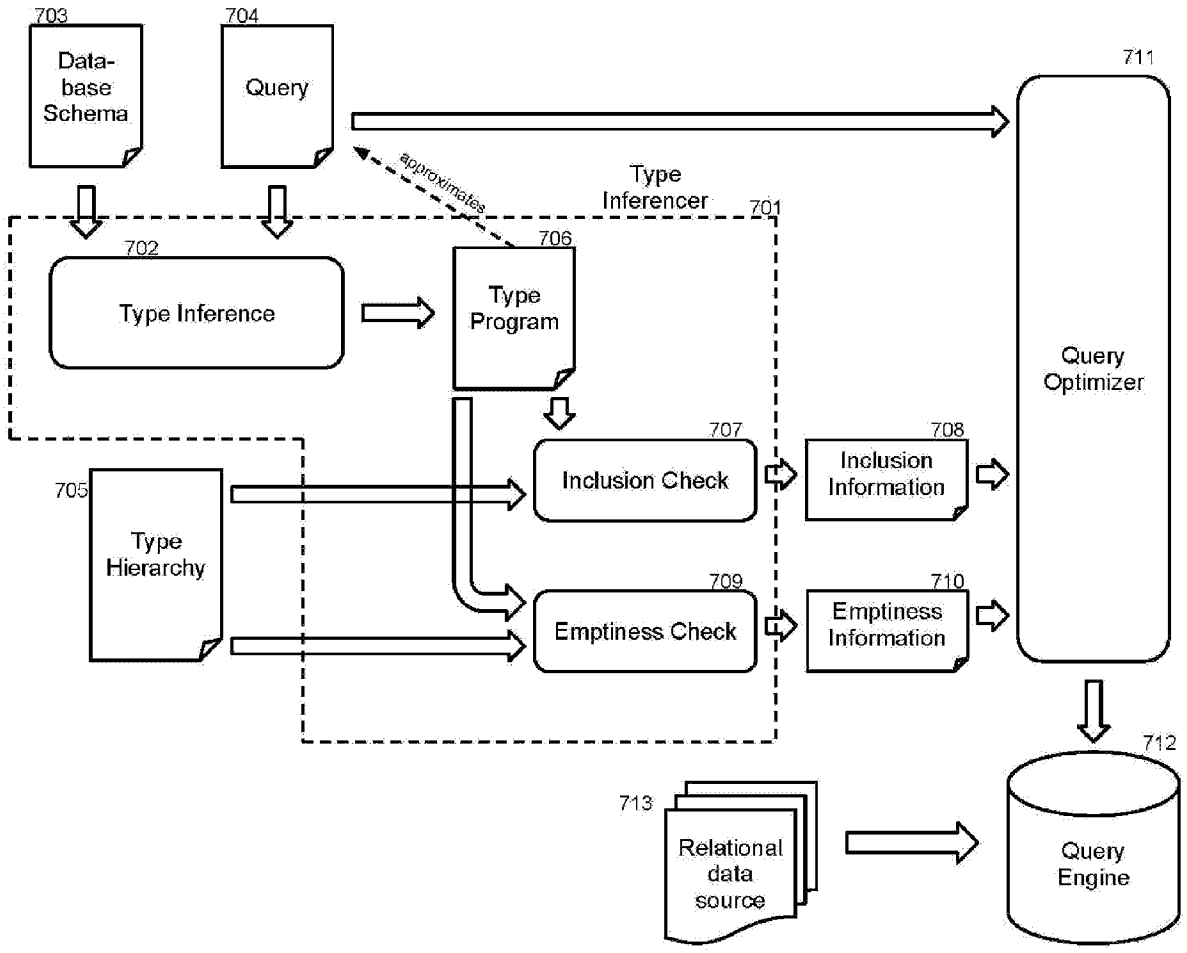
FIG. 7 is a block diagram illustrating how types of database queries are inferred.

FIG. 7 is a block diagram illustrating how types of database queries are inferred. Type inferencer 701 receives database schema 703 and query 704 and infers types from definitions in the program by replacing each use of a database relation in the program by the types in the database schema, resulting in type program 706 as described in the section above entitled "2. Type Programs." The type inferencer furthermore receives type hierarchy 705 to check types in the type program for inclusion as described in the section above entitled "4. Containment Checking," generating information about type inclusion 708. The type inferencer also uses the type hierarchy to generate emptiness information 710 indicating which types in the type program are empty as described in the section above entitled "2. Type Programs." In one embodiment the inclusion and emptiness information is used by query optimizer 711 to generate an optimized version of the query that can be run on query engine 712 to query relational data source 713, as described in the section above entitled "1. Introduction," subsection "Overview."

Figure 8:
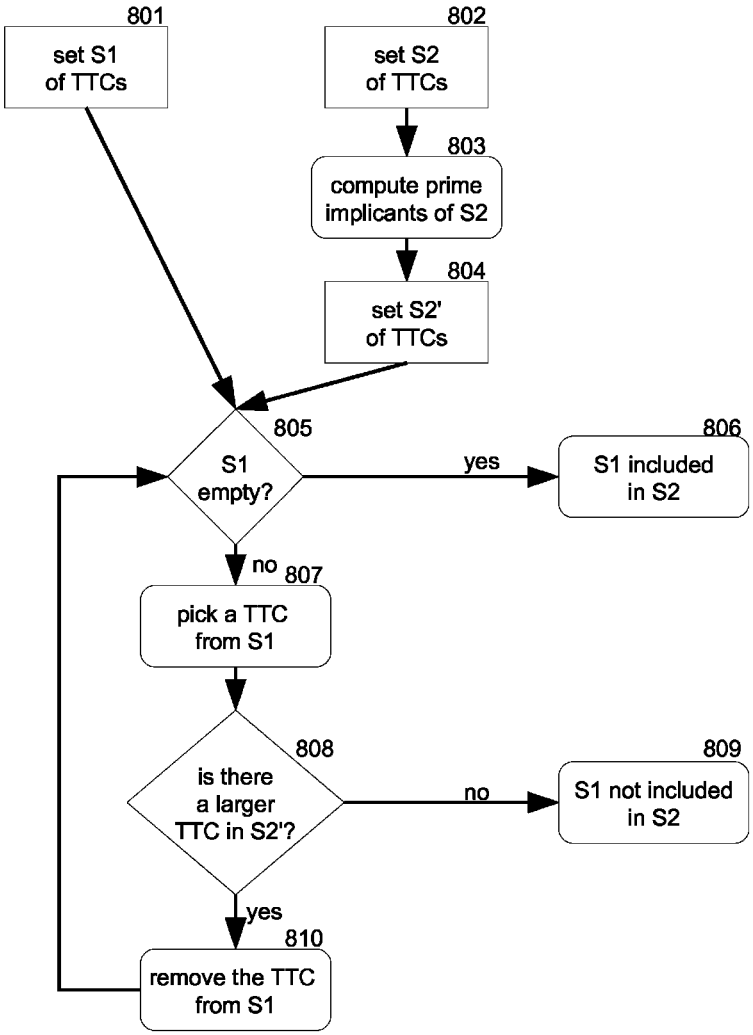
FIG. 8 is a flow chart illustrating inclusion testing for types represented by sets of type tuple constraints (TTCs).

FIG. 8 is a flow chart illustrating inclusion testing for types represented by sets of type tuple constraints (TTCs). To test inclusion of a type represented by a set S1 of TTCs 801 in a type represented by a set S2 of TTCs 802, set S2 is first saturated 803 by adding all prime implicants of all TTCs in S2 to the set, yielding a larger set S2' 804, as described in the section above entitled "4. Containment Checking." All TTCs in S1 are then examined in turn 805, and for every TTC 807 in S1 it is checked whether there is a larger, covering TTC in S2' 808, as described in the section above entitled "4. Containment Checking," subsection "Definition 7." If no such larger TTC is found 809, the type represented by S1 is not included in S2. Otherwise the TTC is removed from S1 810 and the next TTC is examined. If a covering TTC is found for every TTC in S1 806, then the type represented by S1 is included in the type represented by S2.

Figure 9:
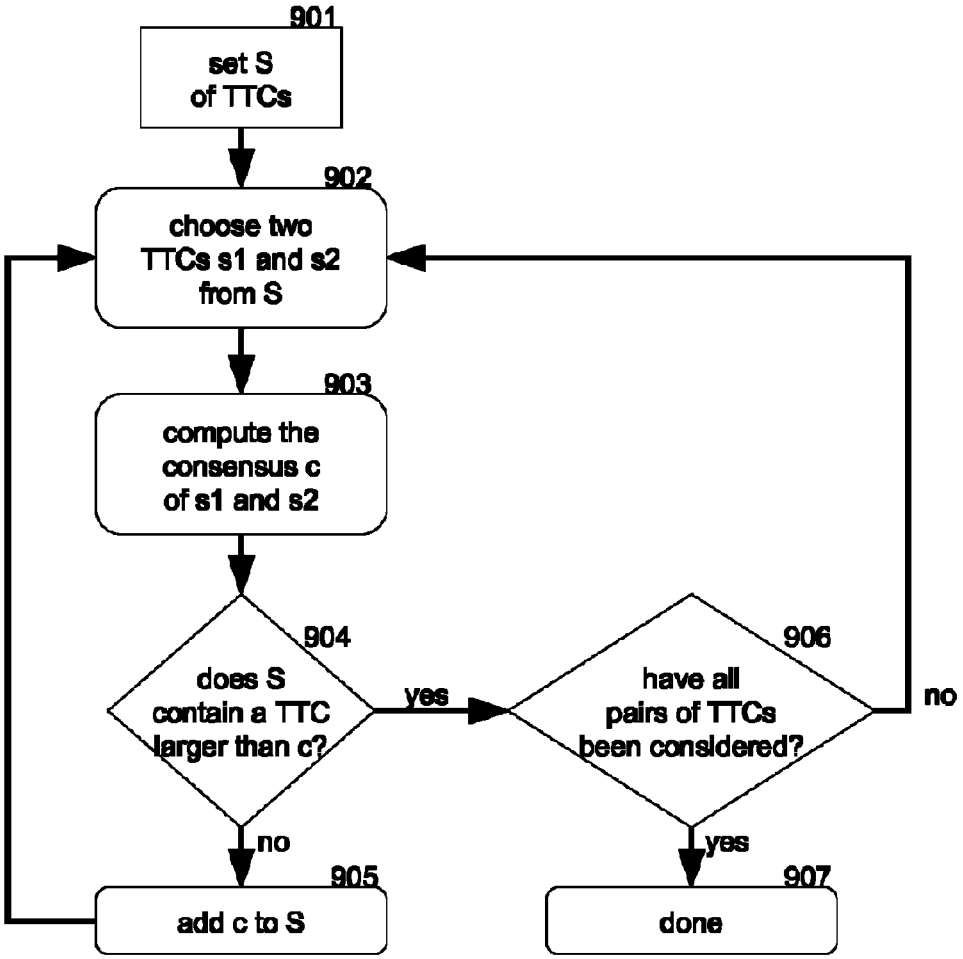
FIG. 9 is a flow chart illustrating saturation of sets of type tuple constraints (TTCs) for inclusion testing.

FIG. 9 is a flow chart illustrating saturation of sets of type tuple constraints (TTCs) for inclusion testing. Starting with a given set S of TTCs 901, every pair of TTCs from S is considered in turn 902, and a consensus of the two TTCs is computed 903, as described in the section above entitled "3. Representing Type Programs," subsection "Definition 4." If S does not contain a TTC larger than the consensus 904, it is added to the set S 905. This is repeated until all pairs of TTCs have been considered 907.

8. Conclusion

We have presented a type inference procedure that assigns an upper envelope to each Datalog program. That envelope is itself a Datalog program that makes calls to monadic extensionals only. The algorithm is able to cope with complex type hierarchies, which may include statements of implication, equivalence and disjointness of entity types.

The type inference procedure is itself an extremely simple syntactic mapping. The hard work goes into an efficient method of checking containment between type programs. We achieve this via a novel adaption of Quine's algorithm for the computation of the prime implicants of a logical formula. Generalising from logical formulae to type programs, we bring types into a saturated form on which containment is easily checked.

As shown by our experiments, the algorithm for inferring a type and saturating it works well on practical examples. While it may still exhibit exponential behaviour in the worst case, such extreme cases do not seem to arise in our application area. Thus our algorithm is a marked improvement over well-known simpler constructions that always require an exponential overhead.

Many avenues for further work remain. Perhaps the most challenging of these is the production of good error messages when type errors are identified: this requires printing the Boolean formulae represented via TTCs in legible form. We have made some progress on this, employing Coudert et al.'s restrict operator on BDDs, which is another application of prime implicants [12].

There is also substantial further engineering work to be done in the implementation. Careful inspection of the statistics show that our use of BDDs is very much unlike their use in typical model checking applications [26], and we believe this could be exploited in the use of a specialised BDD package. For now we are using JavaBDD [25], which is a literal translation of a C-based BDD package into Java.

Finally, we will need to investigate how to best exploit the advanced features offered by our type system. In particular, much experience remains to be gained in how to make it easy and natural for the programmer to specify the constraints making up the type hierarchy, and which kinds of constraints benefit which kinds of programs.

9. Non-Limiting Hardware Examples

Overall, the present invention can be realized in hardware or a combination of hardware and software. The processing system according to a preferred embodiment of the present invention can be realized in a centralized fashion in one computer system, or in a distributed fashion where different elements are spread across several interconnected computer systems and image acquisition sub-systems. Any kind of computer system—or other apparatus adapted for carrying out the methods described herein—is suited. A typical combination of hardware and software is a general-purpose computer system with a computer program that, when loaded and executed, controls the computer system such that it carries out the methods described herein.

An embodiment of the processing portion of the present invention can also be embedded in a computer program product, which comprises all the features enabling the implementation of the methods described herein, and which—when loaded in a computer system—is able to carry out these methods. Computer program means or computer programs in the present context mean any expression, in any language, code or notation, of a set of instructions intended to cause a system having an information processing capability to perform a particular function either directly or after either or both of the following a) conversion to another language, code or, notation; and b) reproduction in a different material form.

Figure 10:
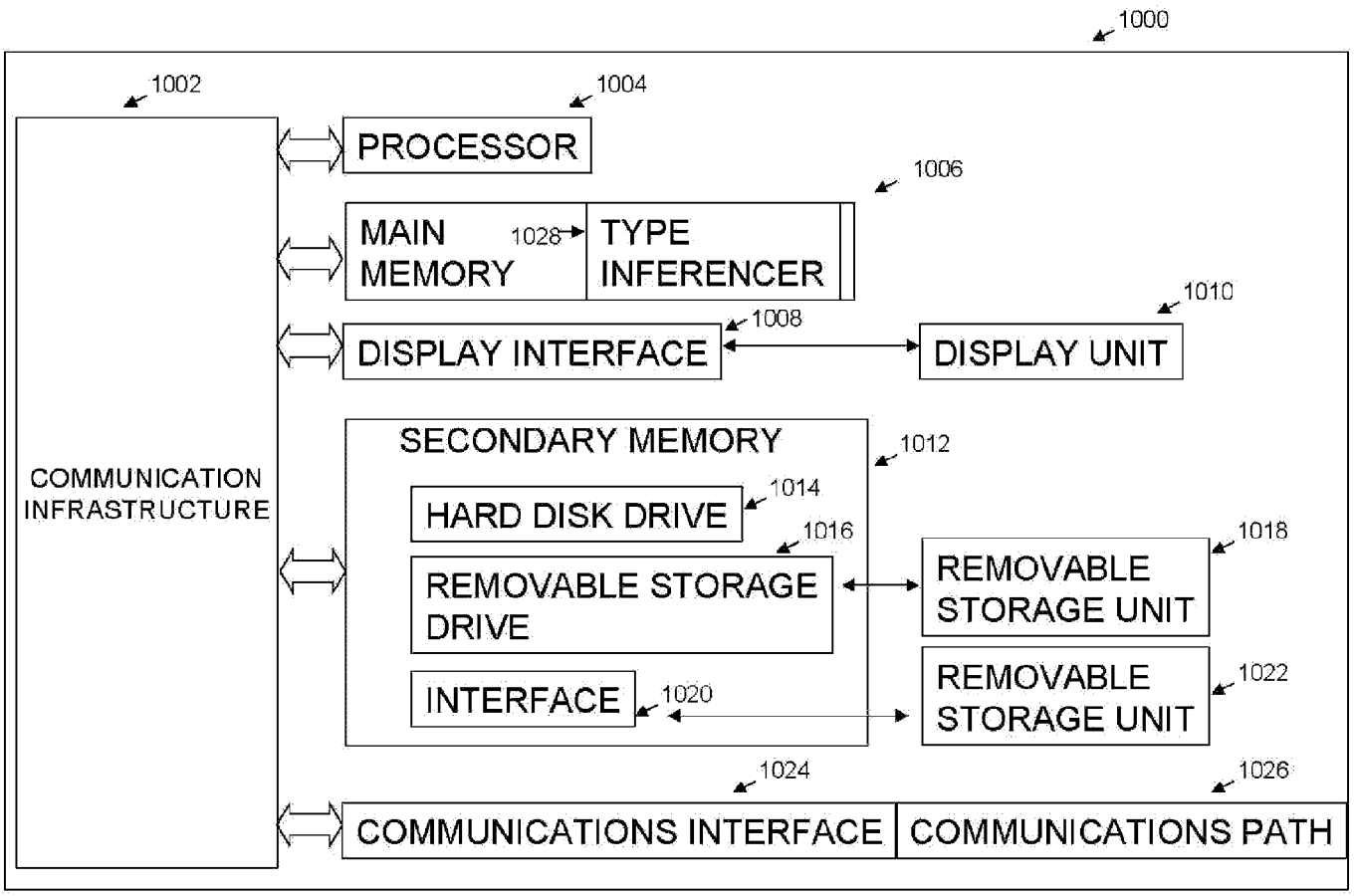
FIG. 10 is a block diagram of a computer system suitable for implementing the various embodiments of the present invention discussed herein according to one embodiment of the present invention.

FIG. 10 is a block diagram of a computer system useful for implementing the software steps of the present invention. Computer system 1000 includes a display interface 1008 that forwards graphics, text, and other data from the communication infrastructure 1002 (or from a frame buffer not shown) for display on the display unit 1010. Computer system 1000 also includes a main memory 1006, preferably random access memory (RAM), and optionally includes a secondary memory 1012. The secondary memory 1012 includes, for example, a hard disk drive 1014 and/or a removable storage drive 1016, representing a floppy disk drive, a magnetic tape drive, an optical disk drive, etc. The removable storage drive 1016 reads from and/or writes to a removable storage unit 1018 in a manner well known to those having ordinary skill in the art. Removable storage unit 1018, represents a CD, DVD, magnetic tape, optical disk, etc. which is read by and written to by removable storage drive 1016. As will be appreciated, the removable storage unit 1018 includes a computer usable storage medium having stored therein computer software and/or data. The terms "computer program medium," "computer usable medium," and "computer readable medium" are used to generally refer to media such as main memory 1006 and secondary memory 1012, removable storage drive 1016, a hard disk installed in hard disk drive 1014, and signals.

Computer system 1000 also optionally includes a communications interface 1024. Communications interface 1024 allows software and data to be transferred between computer system 1000 and external devices. Examples of communications interface 1024 include a modem, a network interface (such as an Ethernet card), a communications port, a PCMCIA slot and card, etc. Software and data transferred via communications interface 1024 are in the form of signals which may be, for example, electronic, electromagnetic, optical, or other signals capable of being received by communications interface 1024. These signals are provided to communications interface 1024 via a communications path (i.e., channel) 1026. This channel 1026 carries signals and is implemented using wire or cable, fiber optics, a phone line, a cellular phone link, an RF link, and/or other communications channels.

Although specific embodiments of the invention have been disclosed, those having ordinary skill in the art will understand that changes can be made to the specific embodiments without departing from the spirit and scope of the invention. The scope of the invention is not to be restricted, therefore, to the specific embodiments. Furthermore, it is intended that the appended claims cover any and all such applications, modifications, and embodiments within the scope of the present invention.

REFERENCES

Each of the following twenty-seven references are hereby incorporated by reference in their entirety.

[1] Serge Abiteboul, Georg Lausen, Heinz Uphoff, and Emmanuel Waller. Methods and rules. In ACM SIGMOD International Conference on Management of Data, pages 32-41. ACM Press, 1993.

[2] Wilhelm Ackermann. Solvable Cases of the Decision Problem. North-Holland Publishing Company, Amsterdam, 1954.

[3] Leo Bachmair, Harald Ganzinger, and Uwe Waldmann. Set constraints are the monadic class. In Logic in Computer Science, pages 75-83, 1993.

[4] Leo Bachmair, Harald Ganzinger, and Uwe Waldmann. Superposition with Simplification as a Decision Procedure for the Monadic Class with Equality. In KGC '93: Proceedings of the Third Kurt Gödel Colloquium on Computational Logic and Proof Theory, pages 83-96, London, UK, 1993. Springer-Verlag.

[5] Sacha Berger, Emmanuel Coquery, Wlodzimierz Drabent, and Artur Wilk. Descriptive Typing Rules for Xcerpt and their soundness. In Francois Fages and Sylvain Soliman, editors, Principles and Practice of Semantic Web Reasoning, volume 3703 of LNCS, pages 85-100. Springer, 2005.

[6] George S. Boolos and Richard C. Jeffrey. Computability and Logic. Cambridge University Press, 3rd edition, 1989.

[7] Ashok K. Chandra and Philip M. Merlin. Optimal Implementation of Conjunctive Queries in Relational Data Bases. In STOC '77: Proceedings of the ninth annual ACM symposium on Theory of computing, pages 77-90, New York, N.Y., USA, 1977. ACM.

[8] Surajit Chaudhuri. Finding nonrecursive envelopes for Datalog predicates. In Principles of Database Systems (PODS), pages 135-146, 1993.

[9] Surajit Chaudhuri and Phokion G. Kolaitis. Can Datalog be approximated? In Principles of Database Systems (PODS), pages 86-96, 1994.

[10] Kevin J. Compton. Stratified least fixpoint logic. Theoretical Computer Science, 131(1):95-120, 1994.

[11] Stavros Cosmadakis, Haim Gaifman, Paris Kanellakis, and Moshe Vardi. Decidable Optimization Problems for Database Logic Programs. In Proceedings of the 20th annual ACM Symposium on Computing, pages 477-490, 1988.

[12] Olivier Coudert, Christian Berthet, and Jean Christophe Madre. Verification of synchronous sequential machines based on symbolic execution. In Automatic Verification Methods for Finite State Systems, volume 407 of Lecture Notes in Computer Science, pages 365-373. Springer, 1989.

[13] Oege de Moor, Damien Sereni, Pavel Avgustinov, and Mathieu Verbaere. Type Inference for Datalog and Its Application to Query Optimisation. In PODS '08: Proceedings of the twenty-seventh ACM SIGMOD-SIGACT-SIGART symposium on Principles of database systems, pages 291-300, New York, N.Y., USA, 2008. ACM.

[14] Oege de Moor, Damien Sereni, Mathieu Verbaere, Elnar Hajiyev, Pavel Avgustinov, Torbjörn Ekman, Neil Ongkingco, and Julian Tibble. .QL: Object-oriented queries made easy. In Ralf Lämmel, João Saraiva, and Joost Visser, editors, Generative and Transformational Techniques in Software Engineering, LNCS. Springer, 2007.

[15] Oege de Moor, Mathieu Verbaere, Elnar Hajiyev, Pavel Avgustinov, Torbjörn Ekman, Neil Ongkingco, Damien Sereni, and Julian Tibble. .QL for source code analysis. In Source Code Analysis and Manipulation (SCAM '07), pages 3-16. IEEE, 2007.

[16] Thom W. Frühwirth, Ehud Y. Shapiro, Moshe Y. Vardi, and Eyal Yardeni. Logic programs as types for logic programs. In Logic in Computer Science (LICS), pages 300-309. IEEE Computer Society, 1991.

[17] John P. Gallagher, Kim S. Henriksen, and Gourinath Banda. Techniques for Scaling Up Analyses Based on Pre-Interpretations. In M. Gabbrielli and G. Gupta, editors, International Conference on Logic Programming (ICLP '05), volume 3668 of LNCS, pages 280-296. Springer, 2005.

[18] John P. Gallagher and Germán Puebla. Abstract Interpretation over Non-deterministic Finite Tree Automata for Set-Based Analysis of Logic Programs. In Practical Aspects of Declarative Languages (PADL), volume 2257 of LNCS, pages 243-261. Springer, 2002.

[19] Nevin C. Heintze and Joxan Jaffar. A finite presentation theorem for approximating logic programs. In Symposium on Principles of Programming Languages (POPL), pages 197-209, 1990.

[20] David Hilbert and Wilhelm Ackermann. Grundzüge der Theoretischen Logik. Julius Springer, Berlin, 1928.

[21] Kim Marriott, Harald Søndergaard, and Neil D. Jones. Denotational Abstract Interpretation of Logic Programs. ACM Transactions on Programming Languages and Systems, 16(3):607-648, 1994.

[22] Willard V. Quine. On Cores and Prime Implicants of Truth Functions. The American Mathematical Monthly, 66(9):755-760, Nov. 1959.

[23] Oded Shmueli. Equivalence of Datalog Queries is Undecidable. Journal of Logic Programming, 15(3):231-241, 1993.

[24] Fang Wei and Georg Lausen. Containment of Conjunctive Queries with Safe Negation. In ICDT '03: Proceedings of the 9th International Conference on Database Theory, pages 346-360, London, UK, 2002. Springer-Verlag.

[25] John Whaley. JavaBDD. http://javabdd.sourceforge.net/, 2007.

[26] Bwolen Yang, Randal E. Bryant, David R. O'Halloran, Armin Biere, Olivier Coudert, Geert Janssen, Rajeev K. Ranjan, and Fabio Somenzi. A Performance Study of BDD-Based Model Checking. In 2nd International Conference on Formal Methods in Computer-Aided Design, volume 1522 of Lecture Notes in Computer Science, pages 255-289. Springer, 1998.

[27] David Zook, Emir Pasalic, and Beata Sarna-Starosta. Typed Datalog. In Practical Aspects of Declarative Languages, pages 168-182. Springer Berlin/Heidelberg, 2009.

What is claimed is:

[1. A computer-implemented method comprising:

accessing a program with one or more queries to a database that contains relations described by at least one database schema;

receiving the database schema and at least one entity type hierarchy for the database; and inferring a first type program from definitions in the program by replacing each use of a database relation in the program by its type in the database schema, and the type is at least portion of a second type program, wherein each of the first type program and the second type program is a derived program using type symbols without other extensional relation symbols, and each of the first type program and the second type program do not contain negation, wherein the first type program and the second type program uses monadic extensions;

testing portion of the first type program that has been inferred for type emptiness and type inclusion; and providing at least one of error information and optimization information regarding the type emptiness and type inclusion being found for the type.]

[2. The computer-implemented method of claim 1, further comprising:

in response to type emptiness being found for a portion of the first type program that has been inferred during determining of the testing portion of the first type program, performing at least one of:

removing the a type test;

providing a notification regarding the emptiness found for the portion of the first type program;

providing notification on combining queries by conjunction without creating empty parts in a combined query;

in response to an empty part of a query being a conjunction, finding a smallest set of query parts that has a conjunction that is empty;

in response to a search for a smallest empty part of a database query that traverses all parts of the database query, pushing a conjunction of an approximation of the smallest empty part and a context on top of a stack of approximations of all contexts where the empty part is being used; and eliminating empty query parts to achieve virtual method resolution in an object-oriented query language.]

[3. The computer-implemented method of claim 1, further comprising:

in response to type inclusion being found for a portion of the first type program that has been inferred during determining of the testing portion of the first type program, performing at least one of:

removing the a type test; and providing a notification regarding the type inclusion being found for the portion type.]

[4. The computer-implemented method of claim 1, further comprising:

testing the type program that has been inferred for whether a database query is contained in a given portion of the type program; and in response to the database query not being contained in the given portion, performing at least one of:

removing a type test; and providing a notification regarding the database query not being contained in the given portion.]

[5. The computer-implemented method of claim 1, wherein portions of the type program that has been inferred are represented by a set of type tuple constraints (TTCs), wherein each of the TTCs includes:

a tuple of type propositions;

an equivalence relation between tuple components; and a set of inhabitation constraints.]

[6. The computer-implemented method of claim 5, further comprising:

checking inclusion of a portion of the type program that has been inferred represented by a first set of TTCs into another portion of the type program represented by a second set of TTCs by computing a set of prime implicants of the second set; and checking each TTC in the first set and finding a larger TTC in the set of prime implicants of the second set of TTCs.]

[7. The computer-implemented method of claim 6, further comprising:

computing the set of prime implicants of the second set of TTCs by saturating the second set by exhaustively applying consensus operations to ensure all relevant TTCs are included.]

[8. The computer-implemented method of claim 7, wherein the consensus operations are performed by receiving two TTCs as operands;

receiving a set of indices and equating all columns whose indices occur in the set, and preserving all other equalities and inhabitation constraints of the operands, and taking disjunctions over columns in the set and conjunctions over all other columns; and taking a union of two or more of the equivalence relations in the operands and a pointwise disjunction of the inhabitation constraints of the operands.]

[9. The computer-implemented method of claim 8, further comprising:

reducing a number of consensus operations that need to be performed during saturation by omitting consensus operations where a resulting TTC will be covered by TTCs already present in the set.]

[10. The computer-implemented method of claim 8, further comprising:

receiving a logical formula that represents a type hierarchy, and representing a component type proposition of a TTC as a binary decision diagram (BDDs), and choosing a BDD variable order by assigning neighboring indices to type symbols that appear in a same conjunct of the logical formula that represents the type hierarchy.]

[11. The computer-implemented method of claim 1, wherein an approximation is used to find erroneous parts of a database query that will return an empty set of results, regardless of contents stored in the database.]

[12. The computer-implemented method of claim 2, wherein the providing notification on combining queries by conjunction without creating empty parts in a combined query includes depicting compatible types with similar pictures in a user interface.]

[13. The computer-implemented method of claim 1, wherein the one or more queries to the database contain calls to other query procedures, and an approximation is used to optimize these called procedures, by eliminating query parts that will return an empty set of results in a context where they are called, regardless of any contents of the database.]

[14. The computer-implemented method of claim 13, wherein the context of a procedure in a database query is computed by traversing a call graph of that query, and keeping a stack of approximations of all contexts where the procedure is being used, and when entering a procedure in the call graph, pushing a conjunction of an approximation of a body of that procedure and a top of the stack onto the stack as a new context.]

[15. The computer-implemented method of claim 1, wherein an approximation is used to optimize queries, by eliminating query parts that test whether a value is included in a portion of the first type program, and the approximation indicates at least one of:

the value will be included in this portion of the first type program regardless of contents stored in the database; and the value will not be included in the portion of the first type program.]

[16. A system comprising:

a memory;

a processor communicatively coupled to the memory; and a type inferencer communicatively coupled to the memory and the processor, wherein the type inferencer is adapted to:

accessing a program with one or more query operations to a database that contains relations described by at least one database schema;

receiving the database schema and at least one entity type hierarchy for the database; and inferring a first type program from definitions in the program by replacing each use of a database relation in the program by its type in the database schema, and the type is at least portion of a second type program, wherein each of the first type program and the second type program is a derived program using type symbols without other extensional relation symbols, and each of the first type program and the second type program do not contain negation, wherein the first type program and the second type program uses monadic extensions;

testing portion of the first type program that has been inferred for type emptiness and type inclusion; and providing at least one of error information and optimization information regarding the type emptiness and type inclusion being found for the type.]

[17. The system of claim 16, wherein the type inferencer is further adapted to:

in response to type emptiness being found for a portion of the first type program that has been inferred during determining of the testing portion of the first type program, performing at least one of:

removing a type test;

providing a notification regarding the emptiness found for the portion of the first type program;

providing notification on combining queries by conjunction without creating empty parts in a combined query;

in response to an empty part of a query being a conjunction, finding a smallest set of query parts that has a conjunction that is empty;

in response to a search for a smallest empty part of a database query that traverses all parts of the database query, pushing a conjunction of an approximation of the smallest empty part and a context on top of a stack of approximations of all contexts where the empty part is being used; and eliminating empty query parts to achieve virtual method resolution in an object-oriented query language.]

[18. The system of claim 16, wherein the type inferencer is further adapted to:

in response to type inclusion being found for a portion of the first type program that has been inferred during determining of the testing portion of the first type program, performing at least one of:

removing a type test; and providing a notification regarding the type inclusion being found for the portion type.]

[19. A non-transitory computer program product, the computer program product comprising instructions for:

accessing a program with one or more query operations to a database that contains relations described by at least one database schema;

receiving the database schema and at least one entity type hierarchy for the database; and inferring a first type program from definitions in the program by replacing each use of a database relation in the program by its type in the database schema, and the type is at least portion of a second type program, wherein each of the first type program and the second type program is a derived program using type symbols without other extensional relation symbols, and each of the first type program and the second type program do not contain negation, wherein the first type program and the second type program uses monadic extensions;

testing portion of the first type program that has been inferred for type emptiness and type inclusion; and providing at least one of error information and optimization information regarding the type emptiness and type inclusion being found for the type.]

[20. The non-transitory computer program product of claim 19, further comprising:

in response to type emptiness being found for a portion of the first type program that has been inferred during determining of the testing portion of the first type program, performing at least one of:

removing a type test;

providing a notification regarding the emptiness found for the portion of the first type program;

providing notification on combining queries by conjunction without creating empty parts in a combined query;

in response to an empty part of a query being a conjunction, finding a smallest set of query parts that has a conjunction that is itself empty;

in response to a search for a smallest empty part of a database query that traverses all parts of the database query, pushing a conjunction of an approximation of that part and a context on top of a stack; and eliminating empty query parts to achieve virtual method resolution in an object-oriented query language.]

*21. A computer program product, the computer program product comprising a hardware storage device comprising instructions to cause a computer system to perform operations comprising:*

*obtaining a query program that queries a database described by a database schema that specifies a column type for every column of every extensional predicate that occurs in the query program and also described by a type hierarchy that is of the form $\forall x.h(x)$ in which $h(x)$ does not contain quantifiers or equations and only contains a single free variable x;*

*representing the query program by a first type program having no free relation variables and having no fixpoint definitions containing intensional relation variables, wherein the column type is at least a portion of a second type program, wherein each of the first type program and the second type program is a derived program, and wherein each of the first type program and the second type program uses monadic extensionals, a type program being a program that only makes use of type symbols and no other extensional relation symbols and that only has instances of negation in front of type symbols that are the names of monadic extensionals;*

*translating the first type program into a typing, wherein the typing is a lean set of non-degenerate n-ary type tuple constraints (TTCs), each TTC being defined by*

*(i) a tuple (t1, . . . tn) of n type propositions ti, a type proposition being a quantifier-free type program with no fixpoint definitions and no free relation variables and having precisely one free element variable,*

*(ii) an equivalence relation over the set of integers $\{1, \ldots, n\}$ that defines a partition of the set of integers $\{1, \ldots, n\}$; and*

*(iii) a set C of inhabitation constraints, each inhabitation constraint being a type proposition, the inhabitation constraints modeling existential quantification;*

*such that the following three requirements are satisfied whenever i and j belong to the same partition under the equivalence relation:*

$$t_i = t_j,$$

*$C <: t_k$ for all $k \in \{1, \ldots, n\}$, and*

*$c <: c'$ for $c, c' \in C$ implies $c = c'$;*

*testing a first TTC of the typing for type emptiness and type inclusion; and*

*providing at least one of error information and optimization information regarding the type emptiness and type inclusion being found for a type program represented by the TTC.*

*22. The computer program product of claim 21, wherein: the type propositions of the TTCs do not contain negation.*

*23. The computer program product of claim 21, wherein: the type hierarchy includes one or more of (i) a statement of implication between entity types, (ii) a statement of equivalence of entity types, or (iii) a statement of disjointness of entity types.*

*24. The computer program product of claim 21, wherein: translating the first type program into the typing comprises eliminating all non-maximal and degenerate TTCs from the set of TTCs.*

*25. The computer program product of claim 21, further comprising instructions to cause the computer system to perform the operations of:*

*representing the TTCs in the typing by encoding the component type propositions of the TTCs as binary decision diagrams.*

*26. The computer program product of claim 21, further comprising instructions to cause the computer system to perform the operations of:*

*building a TTC $\|\tau\|$ from a pre-TTC, the pre-TTC being a structure $\tau = (t_1, \ldots, t_n | p | C)$, in which $t_1, \ldots, t_n$ are a tuple of type propositions, p is a relation over $\{1, \ldots, n\}$, C is a set of inhabitation constraints, which are type propositions, and $\tau$ does not satisfy at least one of the three requirements, by setting:*

$$\|\tau\| := (\|t_1\|_{\bar{p}}, \ldots, \|t_n\|_{\bar{p}} | \bar{p} | \min(C \cup \{t_1, \ldots, t_n\}))$$

*where*

*$\|t_i\|_q = \bigwedge\{t_j | i \sim_q j\}$, where $i \sim_q j$ states that i and j belong to the same partition in q, and*

*$\bar{p}$ is a smallest equivalence relation containing the relation p.*

*27. The computer program product of claim 21, wherein the query program is a first query program and the typing is a first typing, the operations further comprising:*

*obtaining a second query program that queries a second database that is described by the database schema and the type hierarchy;*

*representing the second query program by a third type program having no free relation variables and having no fixpoint definitions containing intensional relation variables;*

*translating the third type program into a second typing; and*

*performing a containment check on the first typing and the second typing to determine whether the first type program contains the third type program.*

*28. The computer program product of claim 27, wherein the data in the second database is different from the data in the first database.*

*29. The computer program product of claim 21, further comprising:*

*performing type specialization and type erasure using the typing to optimize the query program.*

*30. The computer program product of claim 21, wherein the first type program is without fixpoint definitions and has intentional relation variables $r_1, \ldots, r_m$ and element variables $x_1, \ldots, x_n$, and wherein translating the first type program into a typing comprises performing recursion on the structure of the first type program to translate the first type program, denoted φ, to a mapping (φ): $Typing^m \rightarrow Typing$, the mapping being a mapping from a tuple of m typings $\vec{T}$, wherein each of the m typings is associated with a respective one of the m relation variables $r_1, \ldots, r_m$ and the recursion is defined by:*

$$\langle \perp \rangle(\vec{T})=\emptyset$$

$$\langle x_i \doteq x_j \rangle(\vec{T})=\{(T, \ldots, T\backslash\{\underline{[i,j]}\})\}$$

$$\langle u(x_j) \rangle(\vec{T})=\{T^{TTC}{}_{j:=u}\}$$

$$\langle \neg u(x_j) \rangle(\vec{T})=\{T^{TTC}{}_{j:=\neg u}\}$$

$$\langle r_i(\vec{x}) \rangle(\vec{T})=T_i$$

$$\langle \psi \wedge \chi \rangle(\vec{T})=\langle \psi \rangle(\vec{T}) \overline{\wedge} \langle \chi \rangle(\vec{T})$$

$$\langle \psi \vee \chi \rangle(\vec{T})=\langle \psi \rangle(\vec{T}) \underline{\vee} \langle \chi \rangle(\vec{T})$$

$$\langle \exists_{x_i} \psi \rangle(\vec{T})=\exists_i(\langle \psi \rangle(\vec{T}))$$

*wherein*

*the i-th existential of a TTC $\tau=(t_1, \ldots, t_n|p|C)$ is defined as $\exists_i(\tau):=(t_1, \ldots, t_{i-1}, t_{i+1}, \ldots, t_n|p'|min(C\cup\{t_i\}))$*

*where p' is the restriction of p to $\{1, \ldots, i-1, i+1, \ldots, n\}$ and*

*the i-th existential of a typing T is defined pointwise as $\exists_i(T) := max_\perp \{\exists_i(\tau)|\tau\in T\}$,*

*where the operation $max_\perp$ on a set of TTCs removes all non-maximal and degenerate TTCs from the set of TTCs;*

*binary meets and joins of two typings T and T' are defined pointwise and respectively as $T \overline{\wedge} T'=max_\perp(\{\tau\overline{\wedge}\tau'|\tau\in T, \tau'\in T'\})$ and $T \underline{\vee} T'=max_\perp(T\cup T')$;*

*$\{T^{TTC}\}$ is a greatest element under the order <: on a typing, and $\{T^{TTC}{}_{j:=u}\}$ is a second TTC resulting from a first TTC $\{T^{TTC}\}$ by replacing the j-th type proposition in the tuple of type propositions of the first TTC by u in the second TTC and adding u to the inhabitation constraints of the second TTC; and*

*$\{(T, \ldots, T\backslash\overline{\{i,j\}}])\}$ denotes a set of TTCs, which is a typing, with a single TTC in the set, which single TTC has every component of its tuple of type propositions is equal to T, which single TTC has as its partition the smallest equivalence relation in which i and j are equivalent, and which single TTC is trivial;*

*wherein the overall typing is the least fixpoint of the resulting typings $\vec{T}$ after the recursion is complete.*

*31. A system comprising:*

*a computer system comprising one or more computers each having a memory and a processor communicatively coupled to the memory; and*

*a type inferencer computer program loaded in the computer system, wherein the type inferencer is adapted to cause the computer system to perform the operations of:*

*obtaining a query program that queries a database described by a database schema that specifies a column type for every column of every extensional predicate that occurs in the query program and also described by a type hierarchy that is of the form $\forall x.h(x)$ in which $h(x)$ does not contain quantifiers or equations and only contains a single free variable x;*

*representing the query program by a first type program having no free relation variables and having no fixpoint definitions containing intensional relation variables, wherein the column type is at least a portion of a second type program, wherein each of the first type program and the second type program is a derived program, and wherein each of the first type program and the second type program uses monadic extensionals, a type program being a program that only makes use of type symbols and no other extensional relation symbols and that only has instances of negation in front of type symbols that are the names of monadic extensionals;*

*translating the first type program into a typing, wherein the typing is a lean set of non-degenerate n-ary type tuple constraints (TTCs), each TTC being defined by*

*(i) a tuple (t1, . . . tn) of n type propositions ti, a type proposition being a quantifier-free type program with no fixpoint definitions and no free relation variables and having precisely one free element variable,*

*(ii) an equivalence relation over the set of integers $\{1, \ldots, n\}$ that defines a partition of the set of integers $\{1, \ldots, n\}$, and*

*(iii) a set C of inhabitation constraints, each inhabitation constraint being a type proposition, the inhabitation constraints modeling existential quantification;*

*such that the following three requirements are satisfied whenever i and j belong to the same partition under the equivalence relation:*

*$t_i=t_j$,*

*$C<:t_k$ for all $k\in\{1, \ldots, n\}$, and*

*$c<:c'$ for c, $c'\in C$ implies $c=c'$;*

*testing a first TTC of the typing for type emptiness and type inclusion; and*

*providing at least one of error information and optimization information regarding the type emptiness and type inclusion being found for a type program represented by the TTC.*

*32. The system of claim 31, wherein:*

*the type propositions of the TTCs do not contain negation.*

*33. The system of claim 31, wherein:*

*the type hierarchy includes one or more of (i) a statement of implication between entity types, (ii) a statement of*

*equivalence of entity types, or (iii) a statement of disjointness of entity types.*

*34. The system of claim 31, wherein:*

*translating the first type program into the typing comprises eliminating all non-maximal and degenerate TTCs from the set of TTCs.*

*35. The system of claim 31, the operations further comprising:*

*representing the TTCs in the typing by encoding the component type propositions of the TTCs as binary decision diagrams.*

*36. The system of claim 31, the operations further comprising:*

*building a TTC $\|\tau\|$ from a pre-TTC, the pre-TTC being a structure $\tau=(t_1, \ldots, t_n|p|C)$, in which $t_1, \ldots, t_n$ are a tuple of type propositions, p is a relation over $\{1, \ldots, n\}$, C is a set of inhabitation constraints, which are type propositions, and $\tau$ does not satisfy at least one of the three requirements, by setting:*

$$\|\tau\|:=(\|t_1\|_{\bar{p}}, \ldots, \|t_n\|_{\bar{p}}|\bar{p}|\min(C\cup\{t_1, \ldots, t_n\}))$$

*where*

*$\|t_i\|_q=\bigwedge\{t_j|i\sim_q j\}$, where $i\sim_q j$ states that i and j belong to the same partition in q, and $\bar{p}$ is a smallest equivalence relation containing the relation p.*

*37. The system of claim 31, wherein the query program is a first query program and the typing is a first typing, the operations further comprising:*

*obtaining a second query program that queries a second database that is described by the database schema and the type hierarchy;*

*representing the second query program by a third type program having no free relation variables and having no fixpoint definitions containing intensional relation variables;*

*translating the third type program into a second typing; and*

*performing a containment check on the first typing and the second typing to determine whether the first type program contains the third type program.*

*38. The system of claim 37, wherein the data in the second database is different from the data in the first database.*

*39. The system of claim 31, the operations further comprising:*

*performing type specialization and type erasure using the typing to optimize the query program.*

*40. The system of claim 31, wherein the first type program is without fixpoint definitions and has intentional relation variables $r_1, \ldots, r_m$ and element variables $x_1, \ldots, x_n$, and wherein translating the first type program into a typing comprises performing recursion on the structure of the first type program to translate the first type program, denoted $\varphi$, to a mapping $(\varphi)$: $Typing^m \rightarrow Typing$, the mapping being a mapping from a tuple of m typings $\vec{T}$, wherein each of the m typings is associated with a respective one of the m relation variables $r_1, \ldots, r_m$ and the recursion is defined by:*

$$\langle\perp\rangle(\vec{T})=\emptyset$$

$$\langle x_i \doteq x_j\rangle(\vec{T})=\{(T, \ldots, T\overline{\{[i,j]\}})\}$$

$$\langle u(x_j)\rangle(\vec{T})=\{T^{TTC}{}_{j:=u}\}$$

$$\langle \neg u(x_j)\rangle(\vec{T})=\{T^{TTC}{}_{j:=\neg u}\}$$

$$\langle r_i(\vec{x})\rangle(\vec{T})=T_i$$

$$\langle\psi\wedge\chi\rangle(\vec{T})=\langle\psi\rangle(\vec{T})\overline{\wedge}\langle\chi\rangle(\vec{T})$$

$$\langle\psi\vee\chi\rangle(\vec{T})=\langle\psi\rangle(\vec{T})\underline{\vee}\langle\chi\rangle(\vec{T})$$

$$\langle\exists_{x_i}\psi\rangle(\vec{T})=\exists_i(\langle\psi\rangle(\vec{T}))$$

*wherein*

*the i-th existential of a TTC $\tau=(t_1, \ldots, t_n|p|C)$ is defined as $\exists_i(\tau):=(t_1, \ldots, t_{i-1}, t_{i+1}, \ldots, t_n|p'|\min(C\cup\{t_i\}))$*

*where p' is the restriction of p to $\{1, \ldots, i-1, i+1, \ldots, n\}$ and*

*the i-th existential of a typing T is defined pointwise as $\exists_i(T):=\max_\perp\{\exists_i(\tau)|\tau\in T\}$,*

*where the operation $\max_\perp$ on a set of TTCs removes all non-maximal and degenerate TTCs from the set of TTCs;*

*binary meets and joins of two typings T and T' are defined pointwise and respectively as $T\overline{\wedge}T'=\max_\perp(\{\tau\overline{\wedge}\tau'|\tau\in T, \tau'\in T'\})$ and $T\underline{\vee}T'=\max_\perp(T\cup T')$;*

*$\{T^{TTC}\}$ is a greatest element under the order <: on a typing, and $\{T^{TTC}{}_{j=u}\}$ is a second TTC resulting from a first TTC $\{T^{TTC}\}$ by replacing the j-th type proposition in the tuple of type propositions of the first TTC by u in the second TTC and adding u to the inhabitation constraints of the second TTC; and*

*$\{(T, \ldots, T\overline{\{[i,j]\}})\}$ denotes a set of TTCs, which is a typing, with a single TTC in the set, which single TTC has every component of its tuple of type propositions is equal to T, which single TTC has as its partition the smallest equivalence relation in which i and j are equivalent, and which single TTC is trivial;*

*wherein the overall typing is the least fixpoint of the resulting typings $\vec{T}$ after the recursion is completed.*

*41. A computer-implemented method comprising:*

*obtaining a query program that queries a database described by a database schema that specifies a column type for every column of every extensional predicate that occurs in the query program and also described by a type hierarchy that is of the form $\forall x.h(x)$ in which $h(x)$ does not contain quantifiers or equations and only contains a single free variable x;*

*representing the query program by a first type program having no free relation variables and having no fixpoint definitions containing intensional relation variables, wherein the column type is at least a portion of a second type program, wherein each of the first type program and the second type program is a derived program, and wherein each of the first type program and the second type program uses monadic extensionals, a type program being a program that only makes use of type symbols and no other extensional relation symbols and that only has instances of negation in front of type symbols that are the names of monadic extensionals;*

*translating the first type program into a typing, wherein the typing is a lean set of non-degenerate n-ary type tuple constraints (TTCs), each TTC being defined by*

*(i) a tuple (t1, . . . tn) of n type propositions ti, a type proposition being a quantifier-free type program with no fixpoint definitions and no free relation variables and having precisely one free element variable,*

*(ii) an equivalence relation over the set of integers $\{1, \ldots, n\}$ that defines a partition of the set of integers $\{1, \ldots, n\}$, and*

*(iii) a set C of inhabitation constraints, each inhabitation constraint being a type proposition, the inhabitation constraints modeling existential quantification;*

*such that the following three requirements are satisfied whenever i and j belong to the same partition under the equivalence relation:*

$t_i = t_j$, $C <: t_k$ *for all* $k \in \{1, \ldots, n\}$, *and*

$c <: c'$ *for* $c, c' \in C$ *implies* $c = c'$;

*testing a first TTC of the typing for type emptiness and type inclusion; and*

*providing at least one of error information and optimization information regarding the type emptiness and type inclusion being found for a type program represented by the TTC.*

*42. The method of claim 41, wherein:*

*the type propositions of the TTCs do not contain negation.*

*43. The method of claim 41, wherein:*

*the type hierarchy includes one or more of (i) a statement of implication between entity types, (ii) a statement of equivalence of entity types, or (iii) a statement of disjointness of entity types.*

*44. The method of claim 41, wherein:*

*translating the first type program into the typing comprises eliminating all non-maximal and degenerate TTCs from the set of TTCs.*

*45. The method of claim 41, further comprising:*

*representing the TTCs in the typing by encoding the component type propositions of the TTCs as binary decision diagrams.*

*46. The method of claim 41, further comprising:*

*building a TTC* $\|\tau\|$ *from a pre-TTC, the pre-TTC being a structure* $\tau = (t_1, \ldots, t_n | p | C)$, *in which* $t_1, \ldots, t_n$ *are a tuple of type propositions,* $p$ *is a relation over* $\{1, \ldots, n\}$, $C$ *is a set of inhabitation constraints, which are type propositions, and* $\tau$ *does not satisfy at least one of the three requirements, by setting:*

$$\|\tau\| := (\|t_1\|_{\bar{p}}, \ldots, \|t_n\|_{\bar{p}} | \bar{p} | \min(C \cup \{t_1, \ldots, t_n\}))$$

*where*

$\|t_i\|_q = \bigwedge\{t_j | i \sim_q j\}$, *where* $i \sim_q j$ *states that i and j belong to the same partition in q, and* $\bar{p}$ *is a smallest equivalence relation containing the relation p.*

*47. The method of claim 41, wherein the query program is a first query program and the typing is a first typing, the method further comprising:*

*obtaining a second query program that queries a second database that is described by the database schema and the type hierarchy;*

*representing the second query program by a third type program having no free relation variables and having no fixpoint definitions containing intensional relation variables;*

*translating the third type program into a second typing; and*

*performing a containment check on the first typing and the second typing to determine whether the first type program contains the third type program.*

*48. The method of claim 47, wherein the data in the second database is different from the data in the first database.*

*49. The method of claim 41, further comprising:*

*performing type specialization and type erasure using the typing to optimize the query program.*

*50. The method of claim 41, wherein the first type program is without fixpoint definitions and has intentional relation variables* $r_1, \ldots, r_m$ *and element variables* $x_1, \ldots, x_n$, *and wherein translating the first type program into a typing comprises performing recursion on the structure of the first type program to translate the first type program, denoted* $\varphi$, *to a mapping* $(^{SM})$: $Typing^m \rightarrow Typing$, *the mapping being a mapping from a tuple of m typings* $\vec{T}$, *wherein each of the m typings is associated with a respective one of the m relation variables* $r_1, \ldots, r_m$ *and the recursion is defined by:*

$$\langle \perp \rangle(\vec{T}) = \emptyset$$

$$\langle x_i \doteq x_j \rangle(\vec{T}) = \{(T, \ldots, T \setminus \{[i,j]\})\}$$

$$\langle u(x_j) \rangle(\vec{T}) = \{T^{TTC}_{j:=u}\}$$

$$\langle \neg u(x_j) \rangle(\vec{T}) = \{T^{TTC}_{j:=\neg u}\}$$

$$\langle r_i(\vec{x}) \rangle(\vec{T}) = T_i$$

$$\langle \psi \wedge \chi \rangle(\vec{T}) = \langle \psi \rangle(\vec{T}) \overline{\wedge} \langle \chi \rangle(\vec{T})$$

$$\langle \psi \vee \chi \rangle(\vec{T}) = \langle \psi \rangle(\vec{T}) \underline{\vee} \langle \chi \rangle(\vec{T})$$

$$\langle \exists_{x_i} \psi \rangle(\vec{T}) = \exists_i(\langle \psi \rangle(\vec{T}))$$

*wherein*

*the i-th existential of a TTC* $\tau = (t_1, \ldots, t_n | p | C)$ *is defined as* $\exists_i(\tau) := (t_1, \ldots, t_{i-1}, t_{1+1}, \ldots, t_n | p' | \min(C \cup \{t_i\}))$

*where* $p'$ *is the restriction of p to* $\{1, \ldots, i-1, i+1, \ldots, n\}$ *and*

*the i-th existential of a typing T is defined pointwise as* $\exists_i(T) := max_\perp\{\exists_i(\tau) | \tau \in T\}$,

*where the operation* $max_\perp$ *on a set of TTCs removes all non-maximal and degenerate TTCs from the set of TTCs;*

*binary meets and joins of two typings T and T' are defined pointwise and respectively as* $T \overline{\wedge} T' = max_\perp(\{\tau \overline{\wedge} \tau' | \tau \in T, \tau' \in T'\})$ *and* $T \underline{\vee} T' = max_\perp(T \cup T')$;

$\{T^{TTC}\}$ *is a greatest element under the order <: on a typing, and* $\{T^{TTC}_{j=u}\}$ *is a second TTC resulting from a first TTC* $\{T^{TTC}\}$ *by replacing the j-th type proposition in the tuple of type propositions of the first TTC by u in the second TTC and adding u to the inhabitation constraints of the second TTC; and*

$\{(T, \ldots, T \setminus \{[i,j]\})\}$ *denotes a set of TTCs, which is a typing, with a single TTC in the set, which single TTC has every component of its tuple of type propositions is equal to T, which single TTC has as its partition the smallest equivalence relation in which i and j are equivalent, and which single TTC is trivial;*

*wherein the overall typing is the least fixpoint of the resulting typings* $\vec{T}$ *after the recursion is completed.*

*51. A computer program product, the computer program product comprising a hardware storage device comprising instructions to cause a computer system to perform operations comprising:*

*obtaining a query program that queries a database described by a database schema that specifies a column type for every column of every extensional predicate that occurs in the query program and also described by a type hierarchy that is of the form* $\forall x.h(x)$ *in which* $h(x)$ *does not contain quantifiers or equations and only contains a single free variable x;*

*representing the query program by a first type program having no free relation variables and having no fixpoint definitions containing intensional relation variables, wherein the column type is at least a portion of a second type program, wherein each of the first type program and the second type program is a derived*

*program, and wherein each of the first type program and the second type program uses monadic extensionals, a type program being a program that only makes use of type symbols and no other extensional relation symbols, and wherein the first type program and the second type program do not contain negation;*

*translating the first type program into a typing, wherein the typing is a lean set of non-degenerate n-ary type tuple constraints (TTCs), each TTC being defined by*

*(i) a tuple (t1, . . . tn) of n type propositions ti, a type proposition being a quantifier-free type program with no fixpoint definitions and no free relation variables and having precisely one free element variable,*

*(ii) an equivalence relation over the set of integers {1, . . . , n} that defines a partition of the set of integers {1, . . . , n}, and*

*(iii) a set C of inhabitation constraints, each inhabitation constraint being a type proposition, the inhabitation constraints modeling existential quantification;*

*such that the following three requirements are satisfied whenever i and j belong to the same partition under the equivalence relation:*

$t_i=t_j$, $C<:t_k$ *for all* $k\in\{1, \ldots, n\}$, *and*

$c<:c'$ *for* $c, c'\in C$ *implies* $c=c'$;

*testing a first TTC of the typing for type emptiness and type inclusion; and*

*providing at least one of error information and optimization information regarding the type emptiness and type inclusion being found for a type program represented by the TTC.*

*52. A system comprising:*

*a computer system comprising one or more computers each having a memory and a processor communicatively coupled to the memory; and*

*a type inferencer computer program loaded in the computer system, wherein the type inferencer is adapted to cause the computer system perform the operations of:*

*obtaining a query program that queries a database described by a database schema that specifies a column type for every column of every extensional predicate that occurs in the query program and also described by a type hierarchy that is of the form* $\forall x.h(x)$ *in which* $h(x)$ *does not contain quantifiers or equations and only contains a single free variable x;*

*representing the query program by a first type program having no free relation variables and having no fixpoint definitions containing intensional relation variables, wherein the column type is at least a portion of a second type program, wherein each of the first type program and the second type program is a derived program, and wherein each of the first type program and the second type program uses monadic extensionals, a type program being a program that only makes use of type symbols and no other extensional relation symbols, and wherein the first type program and the second type program do not contain negation;*

*translating the first type program into a typing, wherein the typing is a lean set of non-degenerate n-ary type tuple constraints (TTCs), each TTC being defined by*

*(i) a tuple (t1, . . . tn) of n type propositions ti, a type proposition being a quantifier-free type program with no fixpoint definitions and no free relation variables and having precisely one free element variable,*

*(ii) an equivalence relation over the set of integers {1, . . . , n} that defines a partition of the set of integers {1, . . . , n}, and*

*(iii) a set C of inhabitation constraints, each inhabitation constraint being a type proposition, the inhabitation constraints modeling existential quantification;*

*such that the following three requirements are satisfied whenever i and j belong to the same partition under the equivalence relation:*

$t_i=t_j$, $C<:t_k$ *for all* $k\in\{1, \ldots, n\}$, *and*

$c<:c'$ *for* $c, c'\in C$ *implies* $c=c'$;

*testing a first TTC of the typing for type emptiness and type inclusion; and*

*providing at least one of error information and optimization information regarding the type emptiness and type inclusion being found for a type program represented by the TTC.*

*53. A computer-implemented method comprising:*

*obtaining a query program that queries a database described by a database schema that specifies a column type for every column of every extensional predicate that occurs in the query program and also described by a type hierarchy that is of the form* $\forall x.h(x)$ *in which* $h(x)$ *does not contain quantifiers or equations and only contains a single free variable x;*

*representing the query program by a first type program having no free relation variables and having no fixpoint definitions containing intensional relation variables, wherein the column type is at least a portion of a second type program, wherein each of the first type program and the second type program is a derived program, and wherein each of the first type program and the second type program uses monadic extensionals, a type program being a program that only makes use of type symbols and no other extensional relation symbols, and wherein the first type program and the second type program do not contain negation;*

*translating the first type program into a typing, wherein the typing is a lean set of non-degenerate n-ary type tuple constraints (TTCs), each TTC being defined by*

*(i) a tuple (t1, . . . tn) of n type propositions ti, a type proposition being a quantifier-free type program with no fixpoint definitions and no free relation variables and having precisely one free element variable,*

*(ii) an equivalence relation over the set of integers {1, . . . , n} that defines a partition of the set of integers {1, . . . , n}, and*

*(iii) a set C of inhabitation constraints, each inhabitation constraint being a type proposition, the inhabitation constraints modeling existential quantification;*

*such that the following three requirements are satisfied whenever i and j belong to the same partition under the equivalence relation:*

$t_i=t_j$, $C<:t_k$ *for all* $k\in\{1, \ldots, n\}$, *and*

$c<:c'$ *for* $c, c'\in C$ *implies* $c=c'$;

*testing a first TTC of the typing for type emptiness and type inclusion; and*

*providing at least one of error information and optimization information regarding the type emptiness and type inclusion being found for a type program represented by the TTC.*

* * * * *